(12) United States Patent
Takanashi et al.

(10) Patent No.: US 6,262,853 B1
(45) Date of Patent: Jul. 17, 2001

(54) LENS BARREL HAVING DEFORMABLE MEMBER

(75) Inventors: Tatsuo Takanashi; Mitsuhiro Sato, both of Hachioji (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/469,763

(22) Filed: Dec. 22, 1999

(30) Foreign Application Priority Data

| Dec. 25, 1998 | (JP) | H10-370487 |
|---|---|---|
| Dec. 25, 1998 | (JP) | H10-370488 |
| Jan. 18, 1999 | (JP) | H11-009324 |
| Jan. 20, 1999 | (JP) | H11-012179 |
| Jan. 20, 1999 | (JP) | H11-012180 |

(51) Int. Cl.$^7$ .............. G02B 15/14; G02B 7/02
(52) U.S. Cl. .............. 359/703; 359/822
(58) Field of Search .............. 359/694, 696, 359/700, 703, 704, 813, 814, 820, 822, 819

(56) References Cited

U.S. PATENT DOCUMENTS

| 5,162,951 | * | 11/1992 | Sorce | 359/871 |
| 5,383,168 | * | 1/1995 | O'Brien et al. | 369/44.14 |
| 5,903,387 | | 5/1999 | Tomikawa et al. | 359/412 |
| 6,166,868 | * | 12/2000 | Holderer et al. | 359/819 |

FOREIGN PATENT DOCUMENTS

| 59-68710 | 4/1984 | (JP) . |
| 60-150511 | 10/1985 | (JP) . |
| 61-46895 | 10/1986 | (JP) . |
| 61-190515 | 11/1986 | (JP) . |

\* cited by examiner

*Primary Examiner*—Ricky Mack
(74) *Attorney, Agent, or Firm*—Ostrolenk, Faber, Gerb & Soffen, LLP

(57) ABSTRACT

A body of a lens frame, which is a lens barrel of the present invention, consists of an inner frame for holding a lens, an intermediate frame in which an adjusting screw is screwed, and an outer frame in which an adjusting screw is screwed. The frames are connected to one another by parallel springs. In the case of this lens frame, the inner frame is displaced in the direction of X-axis or a horizontal axis by screwing the adjusting screw thereinto in the direction of the horizontal axis and screwing another adjusting screw thereinto by the direction of a vertical axis. Thus, the inner frame is displaced in Y-direction through the intermediate frames. Consequently, the translation of the position of the optical axis of the lens is performed without inclination of the intermediate frame. Hence, the adjustment of the position of the optical axis is easily achieved. Moreover, this lens frame achieves a reduction in the cost of components thereof.

22 Claims, 26 Drawing Sheets

LENS BARREL HAVING DEFORMABLE MEMBER

BACKGROUND OF THE INVENTION

1. Field of the Invention

The present invention relates to a lens barrel enabled to adjust the position of an optical axis of a frame member and/or the inclination of the optical axis thereof.

2. Description of the Related Art

A conventional lens adjusting device for correcting misalignment of the center of an optical axis of a lens according to a utility model, which relates to a lens frame and is proposed in the Japanese Utility Model Laid-Open No. 60-150511 Official Gazette, utilizes rotatable eccentric screws or pins. This conventional device has an adjusting structure including plural notch portions, each of which is provided in an outer periphery of the lens and engaged with an eccentric pin. The aforementioned device causes a micromovement of the lens in a direction perpendicular to the optical axis thereof by rotating the eccentric pins, so that the centering of the lens is achieved.

However, the conventional device proposed in the Japanese Utility Model Laid-Open No. 60-150511 Official Gazette requires plural eccentric pins and is thus disadvantageous in cost thereof. Further, it is necessary for moving the lens in the direction perpendicular to the optical axis to simultaneously or alternately rotate plural eccentric pins. Therefore, the conventional device has a drawback in that it is difficult to perform the centering of the lens. Moreover, in the case of some support structure for the lens, there is the possibility that when the eccentric pins are rotated, the optical axis of the lens does not simply perform translation but inclines.

Furthermore, a conventional method of assembling a lens system for correcting the misalignment of the lens frame, which includes the inclination of the optical axis thereof, according to an invention is proposed in the Japanese Patent Laid-Open No. 59-68710 Official Gazette. According to this conventional method, a lens system is assembled and aligned by correcting the misalignment including the inclination of the optical axis of the lens in a state in adjacent lenses are held by space forming rings, and by subsequently bonding the lenses with the space forming rings on the outer periphery thereof and fixing the lenses thereon.

In the case of the assembling method proposed in the Japanese Patent Laid-Open No. 59-68710, there is the probability that the optical center is changed simultaneously with adjusting the inclination of the optical axis of the lens. Hence, the adjustment of only the inclination of the optical axis of the lens cannot be performed. Further, even in the case of adjusting the inclination and position of the optical axis of a lens, both the inclination and position thereof simultaneously change, as described above. Thus, this conventional method has a drawback in that it is difficult to perform such an adjusting operation.

Moreover, a semiconductor laser light source serving as a device including an optical axis position adjusting structure of a support portion (namely, a frame portion) for supporting an optical component is disclosed in the Japanese Patent Publication No. 61-46895 Official Gazette, and has an optical axis position adjusting structure that can perform fine adjustment of the optical axis position of a frame portion for supporting a semiconductor laser chip. FIG. 40 is an enlarged diagram illustrating the concept of the optical axis position adjusting structure.

In the optical axis position adjusting structure, a frame portion 311$b$ for holding a laser light source portion acting as an optical component is supported against a support portion 311$a$ through an elastically deformable cantilever-like plate spring portion 311$c$. When a side of a lens frame portion 311$b$ is pushed by exerting a pressing force $F_0$ thereon so as to adjust the optical axis position in the lateral direction of the optical component, the optical axis position $Z_0$ is displaced leftwardly, as viewed in this figure, to a position $Z_1$, to which the optical axis position is adjusted, by a movement amount $\delta_{x0}$.

However, simultaneously, the optical axis position is displaced upwardly or downwardly by a movement amount $\delta_{y0}$, so that the adjustment of the optical axis position in the upward or downward is necessary. Furthermore, when the center of the optical axis is moved from the position $Z_0$ to the position $Z_1$, the optical component rotates around the optical axis. This adversely affects the entire optical system. Thus, this conventional device has a drawback in that the adjustment of the optical axis position cannot be favorably achieved.

SUMMARY OF THE INVENTION

The present invention is accomplished to eliminate the aforementioned drawbacks of the prior art. Accordingly, an object of the present invention is to provide a lens barrel, which reliably and easily achieves the adjustment of an optical member, that is, operations of centering and adjusting the optical axis of the optical member, or an operation of adjusting the inclination of the optical axis, or operations of centering the optical axis and adjusting the inclination of the optical axis.

To achieve the foregoing object, according to an aspect of the present invention, there is provided a lens barrel, which comprises a guide member, a moving frame, and adjusting members. The moving frame is guided by the guide member, and comprises a first frame portion having an optical axis, a second frame portion, a third frame portion guided by the guide member in a direction of the optical axis, a first connecting portion for connecting the first frame portion to the second frame portion, and a second connecting portion for connecting the second frame portion to the third frame portion. The adjusting members are provided in the second and third frame portions, respectively. Further, the adjusting members deform the first and second connecting portions, and perform translation (parallel displacement) adjustment of the first frame in a plane orthogonal to the optical axis without causing rotational displacement of the first frame portion.

According to another aspect of the present invention, there is provided a lens barrel, which comprises a guide member, a moving frame, and adjusting members. The moving frame is guided by the guide member, and comprises a first frame portion having an optical axis, a second frame portion, a third frame portion guided by the guide member in a direction of the optical axis, a first connecting portion for connecting the first frame portion to the second frame portion, and a second connecting portion for connecting the second frame portion with the third frame portion. The adjusting members are provided in the second and third frame portions, respectively. Further, the adjusting members adjust the inclination of the optical axis of the first frame portion.

According to anther aspect of there is provided a lens barrel, which comprises a guide member, a moving frame, and first and second adjusting members. The moving frame is guided by the guide member, and comprises a first frame portion having an optical axis, a second frame portion, a third frame portion guided by the guide member in a direction of the optical axis, a first connecting portion for connecting the first frame portion to the second frame portion, and a second connecting portion for connecting the second frame portion to the third frame portion. The first adjusting members are provided in the second and third frame portions, respectively. Further, the first adjusting members deform the first and second connecting portions, and perform translation (parallel displacement) adjustment of the first frame in a plane orthogonal to the optical axis without causing rotational displacement of the first frame portion. Moreover, the second adjusting members are provided in the second and third frame portions, respectively, and adjust the inclination of the optical axis of the first frame portion.

According to another aspect of the present invention, there is provided a lens barrel, which comprises a frame member and adjusting members. The frame member comprises a first frame portion having an optical axis, a second frame portion, a third frame portion, a first connecting portion for connecting the first frame portion to the second frame portion, and a second connecting portion for connecting the second frame portion to the third frame portion. The adjusting members are provided in the second and third frame portions, respectively. Further, the adjusting members adjust the inclination of the optical axis of the first frame portion.

According to another aspect of the present invention, there is provided a lens barrel, which comprises a frame member and first and second adjusting members. The frame member comprises a first frame portion having an optical axis, a second frame portion, a third frame portion, a first connecting portion for connecting the first frame portion to the second frame portion, and a second connecting portion for connecting the second frame portion to the third frame portion. Further, the first adjusting members deform the first and second connecting portions, and perform translation (parallel displacement) adjustment of the first frame in a plane orthogonal to the optical axis without causing rotational displacement of the first frame portion. Moreover, the second adjusting members are provided in the second and third frame portions, respectively. Further, the adjusting members adjust the inclination of the optical axis of the first frame portion.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Before the detailed description of the preferred embodiments of the present invention, a description is given about the concept of an optical axis position adjusting structure, which is applicable to a lens barrel of the present invention, for adjusting the optical axis position (namely, a position in a direction perpendicular to a direction of an optical axis) of a lens frame (namely, a frame member), which is operative to hold an optical device.

Figure 1A:
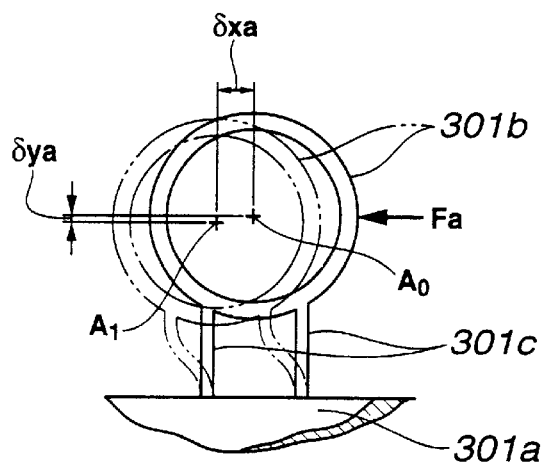
FIG. 1(A) is an enlarged plan view showing an example of the concept of an optical axis position adjusting structure of a lens frame in a lens barrel of the present invention in the case of employing a structure in which a frame portion is cantilevered by a parallel spring.
Figure 1B:
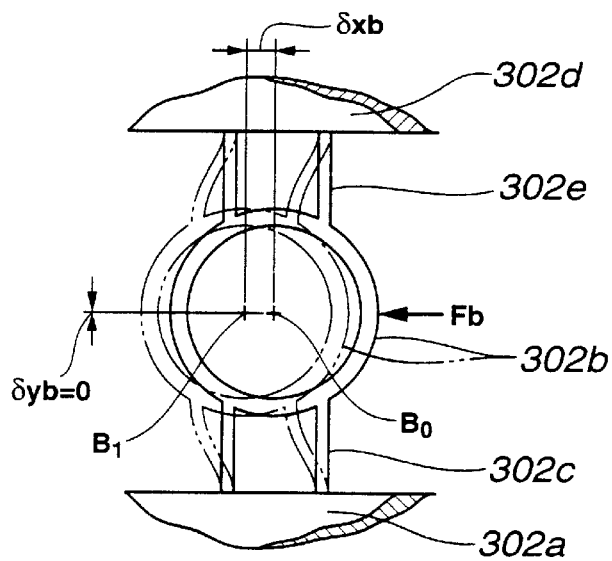
FIG. 1(B) is an enlarged plan view showing another example of the concept of the optical axis position adjusting structure of a lens frame in a lens barrel of the present invention in the case of employing a structure in which a frame portion is supported at both ends thereof by parallel springs.
Figure 1C:
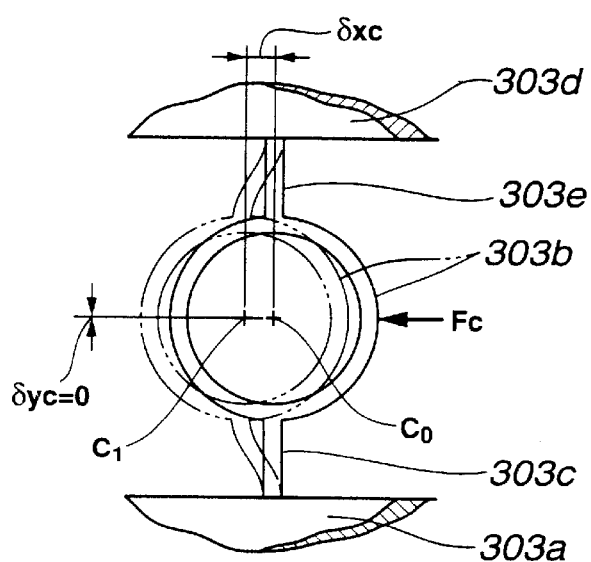
FIG. 1(C) is an enlarged plan view showing still another example of the concept of the optical axis position adjusting structure of a lens frame in a lens barrel of the present invention in the case of employing a structure in which a frame portion is supported at both ends thereof by opposed simple plate springs.

In the case of the optical axis position adjusting structure of the lens frame, an optical device is directly or indirectly supported by an elastically deformable plate spring and pushing the frame portion in an adjusting direction. Thus, the optical axis position of an optical device adjusted. FIGS. 1(A), 1(B), and 1(C) are enlarged diagrams schematically illustrating the adjusting structures, which differ from one another in frame-portion supporting structure. FIG. 1(A) shows a structure in which a frame portion is cantilevered by a parallel spring. FIG. 1(B) shows a structure in which a frame portion is supported at both ends thereof by parallel springs. FIG. 1(C) shows a structure in which a frame portion is supported at both ends thereof by opposed simple plate springs.

In the case of the optical axis position adjusting structure of the lens frame of FIG. 1(A), a frame portion 301b for holding an optical device is supported against a support portion 301a by an elastically deformable cantilevered parallel spring portion 301c. When a side of the frame portion 301b is pushed by exerting a pressing force $F_0$ thereon so as to adjust the optical axis position in the lateral direction of the optical device, the optical axis position $A_0$ is displaced leftwardly, as viewed in this figure, to a position $A_1$, to which the optical axis position is adjusted, by a movement amount $\delta_{xa}$. The parallel spring portion 301c deforms while maintaining nearly the horizontal position (parallel position) thereof. Thus, a movement amount $\delta_{ya}$ in an upward or downward direction is very small. Consequently, the rotational component of a movement of the optical device held in the frame portion is very small, so that favorable adjustment is achieved.

In the case of the frame position adjusting structure of FIG. 1(B), a frame portion 302b for supporting an optical device is supported at both ends thereof against a support portion 302a by elastically deformable parallel spring portions 302c and 302e, which are in a both-end supporting state. When a side of the frame portion 301b is pushed by exerting a pressing force $F_b$ thereon so as to adjust the optical axis position in the lateral direction of the optical device, the optical axis position $B_0$ is displaced leftwardly, as viewed in this figure, to a position $B_1$, to which the optical axis position is adjusted, by a movement amount $\delta_{xb}$. The parallel spring portions 302c and 302e deform while these spring portions support the frame portion 302b from above and below by maintaining a state in which these spring portions are nearly parallel to each other. Thus, a movement amount $\delta_{yb}$ in an upward or downward direction is very small. Consequently, the rotational component of a movement of the optical device held in the frame portion is very small, so that favorable adjustment is attained.

In the case of the frame position adjusting structure of FIG. 1(C), a frame portion 303b for supporting an optical device is supported at both ends thereof against upper and lower support portions 303a and 303d by elastically deformable parallel spring portions 303c and 303e, which are in a both-end supporting state. When a side of the frame portion 303b is pushed by exerting a pressing force $F_c$ thereon so as to adjust the optical axis position in the lateral direction of the optical device, the optical axis position $C_0$ is displaced leftwardly, as viewed in this figure, to a position $C_1$, to which the optical axis position is adjusted, by a movement amount $\delta_{yc}$. The parallel spring portions 303c and 303e deform while these spring portions support the frame portion 303b from above and below by maintaining a state in which these spring portions are nearly parallel to each other. Thus, a movement amount $\delta_{yc}$ in an upward or downward direction is very small. Consequently, the rotational component of a movement of the optical device held in the frame portion is very small, so that favorable adjustment is achieved.

Among the embodiments of the present invention, first, a lens frame, which is a lens barrel of a first embodiment, will be described hereinbelow.

Figure 2:
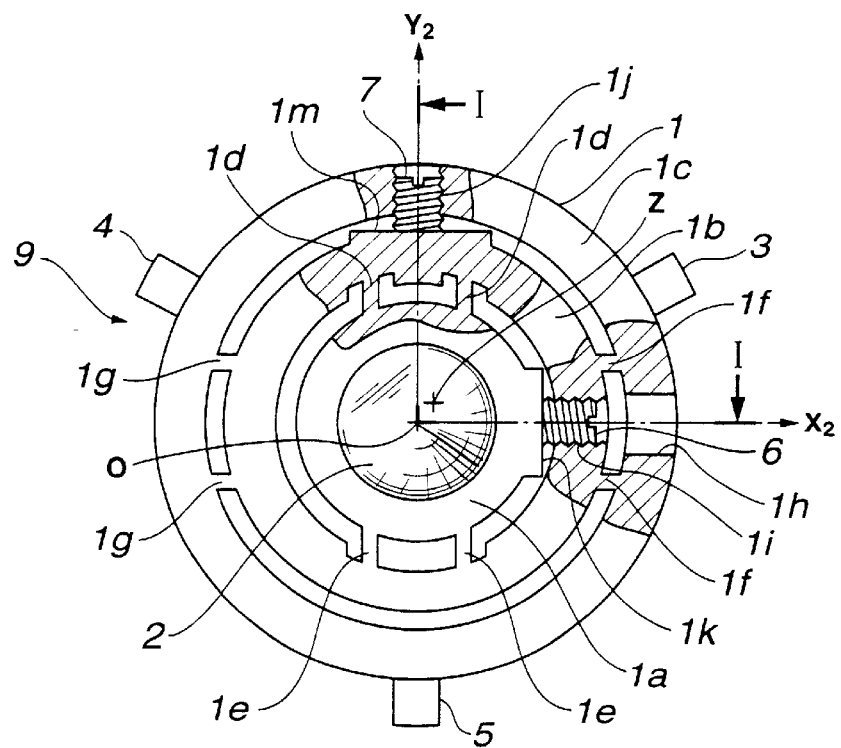
FIG. 2 is a plan view illustrating a lens frame that is a first embodiment of a lens barrel of the present invention.
Figure 3:
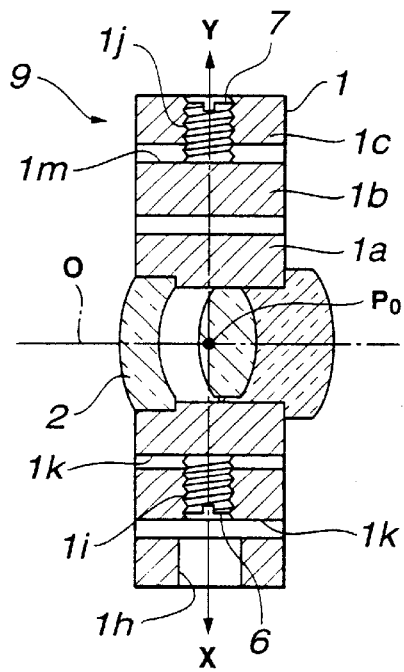
FIG. 3 is a sectional view taken on line I-O-I of FIG. 2.
Figure 4:
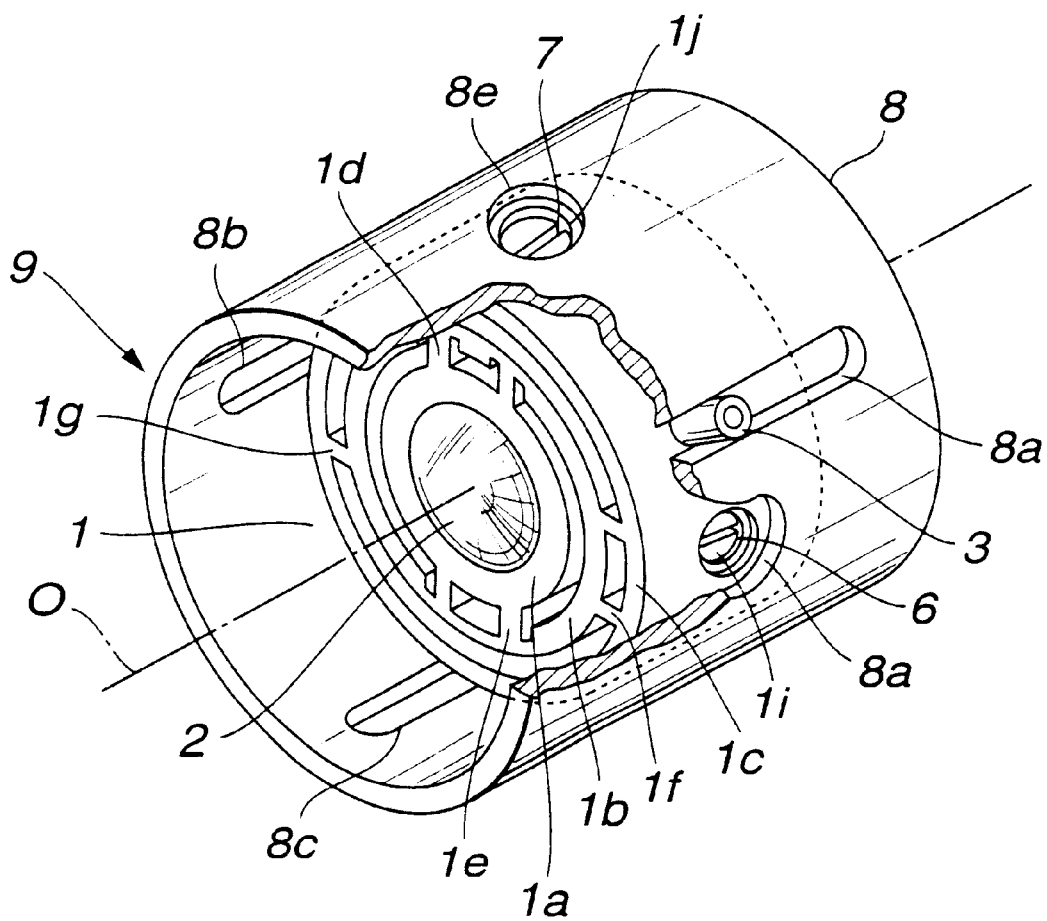
FIG. 4 is a perspective view illustrating a state in which the lens frame of the first embodiment is inserted into a guide frame of the lens barrel.

FIG. 2 is a plan view of the lens frame that is the first embodiment. Further, FIG. 3 is a sectional view taken on line I-O-I of FIG. 2. FIG. 4 is a perspective view of the lens frame inserted in a guide frame of a lens barrel.

A lens frame 9 of this embodiment is a lens barrel, or a lens frame adapted so that the position of an optical system incorporated into optical equipment is adjustable. The lens frame 9 consists mainly of a lens frame body 1, and a lens 2, which serves as an optical member (namely, an optical device) held in the lens frame body, and cam followers 3, 4, and 5. This lens frame 9 is adapted so that the fine adjustment of the optical system position of the lens 2, namely, the optical axis position of the lens 2 with respect to the lens frame body 1 can be performed (that is, lens centration can be effected).

An adjustment reference for adjustment of the optical axis position may be the outermost diameter of the lens frame body 1, and is selected according to a condition in which the lens frame is mounted in the optical equipment.

Incidentally, let "X-axis" and "Y-axis" respectively denote axes, which are perpendicular to the optical axis O of the lens 2 and orthogonal to each other and which pass through the center $P_0$ in the direction of the optical axis of the lens 2 and correspond to horizontal and vertical directions.

The lens frame body 1 is an integral member in which a connecting portion (to be described later) connects the following frames 1a, 1b, 1c, that is, a ring-like inner frame 1a serving as a holding member for holding the lens 2, a ring-like intermediate frame 1b serving as a first support frame disposed so that the frame 1b surrounds the outer periphery of the inner frame 1a and that a gap is formed between the frames 1a and 1b, and a ring like outer frame 1c disposed so that the frame 1c surrounds the outer periphery of the intermediate frame 1b and that a gap is formed between the frames 1b and 1c. Incidentally, the cam followers 3, 4, and 5 are securely fixed at positions at which the outer circumference of the outer frame 1c is trisected.

The inner frame 1a and the intermediate frame 1b are connected by parallel spring portions 1d and 1e, which are formed in such a way as to be integral with these frames 1b and 1c, and which are two deformable plate-like first connecting portions extending upwardly and downwardly in parallel with each other in such a way as to be laid across Y-axis, as viewed from the direction of the optical axis.

Further, the intermediate frame 1b and the outer frame 1c are connected by parallel spring portions 1f and 1g, which are formed in such a way as to be integral with these frames 1b and 1c, and which are two deformable plate-like second connecting portions extending laterally in parallel with each other in such a way as to be laid across X-axis, as viewed from the direction of the optical axis.

Incidentally, it is assumed that the parallel spring portions 1d and 1e can elastically deform in the direction of X-axis, while the parallel spring portions 1f and 1g can elastically deform in the direction of Y-axis. Further, these parallel springs respectively have shapes, which are nearly symmetrical with respect to planes containing X-axis and Y-axis, so that when these parallel springs are pushed by adjustment screws through screw abutting portions in corresponding directions, the inner frame 1a or the intermediate frame 1b is deformed in such a way as to perform translation (parallel displacement) without being inclined to the optical axis O.

In the intermediate frame 1b, a female screw portion 1i is provided on X-axis. In the inner frame 1a, a screw abutting surface 1k is provided at a place inwardly opposed to the female screw portion 1i. Furthermore, in the outer frame 1c, an opening 1h, through which an adjustment screw passes, is provided at a place outwardly opposed to the female screw portion 1i. Similarly, in the outer frame 1c, a female screw portion 1j is provided on Y-axis. In the intermediate frame 1b, a screw abutting surface 1m is provided at a place inwardly opposed to the female screw 1j.

A first adjustment screw 6 serving as a first adjusting member is screwed into the female screw portion 1i of the intermediate frame 1b through the opening 1h. Further, an adjustment screw 7 serving as a second adjusting member is screwed into the female screw portion 1j of the outer frame 1c. Incidentally, the adjustment screws 6 and 7 are slotted machine screws.

Additionally, the initial lens optical axis position Z is set in such a way as to be slightly rightwardly and upwardly eccentric from the position of an optical axis O, which is an adjustment target position, as viewed in FIG. 2. An eccentricity amount of the position Z in a state, in which the optical system position is unadjusted, immediately upon completion of assembling the lens frame 9 of this embodiment is set in such a manner as to be more than at least an adjustment amount of the lens optical axis position, with intention of performing adjustment by maintaining a state in which the adjustment screws 6 and 7 are screwed thereinto and which end faces of the screws 6 and 7 are abutted against the screw abutting surfaces 1k and 1m.

Next, an optical system position adjusting operation of the lens frame 9 of the first embodiment constructed as described above will be described hereinbelow.

First, when the lens frame 9 is adjusted singly, the outer periphery of the outer frame 1c of the lens frame body 1, to which the lenses 2 and the cam followers 3, 4, and 5 are fitted, is held by an adjustment jig. Then, adjustment screws 6 and 7 are inserted into the female screw portions 1i and 1j. The adjustment screws 6 and 7 are screwed thereinto by simultaneously observing a detection signal generated by a point light source portion and an optical-axis detecting CCD portion provided in the adjustment jig. Thus, the adjustment of the initial lens optical is performed by causing a micromovement of the initial lens optical axis position Z to the adjustment target position of the optical axis O. Thereafter, the adjustment screws 6 and 7 are fixed to the female screw portions 1i and 1j by adhesives. Then, the adjustment of the optical axis position Z is finished.

Incidentally, the movement of the optical axis position Z at the time of the adjustment thereof is realized by deforming the parallel spring portions (namely, deforming portions) 1d and 1e in the direction of X-axis, and deforming the parallel spring portions (namely, deforming portion) 1f and 1g in the direction of Y-axis. This deformation is microdeformation and synthesized from bending strain, which is caused due to the bending moment of the parallel spring portion, and shearing strain, which is caused owing to the hearing force thereof. Further, if readjustment of the lens frame is not performed, such deformation may be obtained by utilizing not only elastic deformation but also plastic deformation.

Furthermore, in the case that the adjustment of the lens frame 9 is performed in a state in which the lens frame 9 is incorporated into the guide frame 8 holding the lens frame as shown in a perspective diagram of FIG. 4, the lens frame body 1, into which the lens 2 is incorporated, is mounted in the guide frame 8. The cam followers 3, 4, and 5 are inserted into guide grooves 8a, 8b, and 8c and securely fixed to the outer frame 1c. Then, the adjustment screws 6 and 7 are inserted into the female screw portions 1i and 1j from the outer-periphery side of the guide frame 8 through the adjustment openings 8d and 8e. Thereafter, the adjustment of the lens frame 9 is performed by using the aforementioned adjustment jig, similarly as in the case of performing the adjustment of the lens frame singly.

As described above, in the case of the lens frame 9 of the first embodiment, the lens frame body 1 has an integral structure. Thus, the lens frame 9 has a simple configuration. Moreover, the adjustment of the position of the lens optical axis O is attained by using two adjustment screws. This makes the adjustment thereof extremely easy to perform. Furthermore, even if the adjustment of the position of the lens optical axis O is performed, the optical axis O is prevented from being inclined. Consequently, a lens frame with high optical accuracy is obtained. Further, even if the lens frame is incorporated into the guide frame such as a cam ring, the adjustment can be effected by inserting the adjustment screws from the outer periphery of the guide frame through the adjustment opening.

Incidentally, simple-plate-spring-like connecting portions or simple cylindrical connecting portions may be employed as the connecting portions 1d, 1e or 1f, 1g of the lens frame 9 of the aforementioned first embodiment, instead of the parallel spring like portions. Moreover, although the deformation caused in the parallel spring portions at the time of the adjustment is synthesized from the bending distortion and the shearing distortion, the adjustment may be performed by utilizing only one of the bending distortion and the shearing distortion.

Furthermore, even if the lens 2 and the lens frame body 1 are formed in such a way as to be integral with each other, the optical system position adjusting structure of the aforementioned embodiment may be applied to such a lens frame. Additionally, screws having locking functions may be employed as the adjustment screws 6 and 7. This eliminates the need for an adhesion operation performed in the aforementioned embodiment after the adjustment.

Further, although the parallel spring portions serving as the connecting portions are molded in such a manner as to be integral with the lens frame body 1, a metallic plate spring member may be formed by being insert-molded in the lens frame body. In this case, the adjustment amount can be set at a large value. Moreover, the lens frame body is formed by being molded. However, a press-molded metallic plate may be employed as the lens frame body.

Next, a lens frame, which is a lens barrel that is a second embodiment of the present invention, will be described hereunder.

Figure 5:
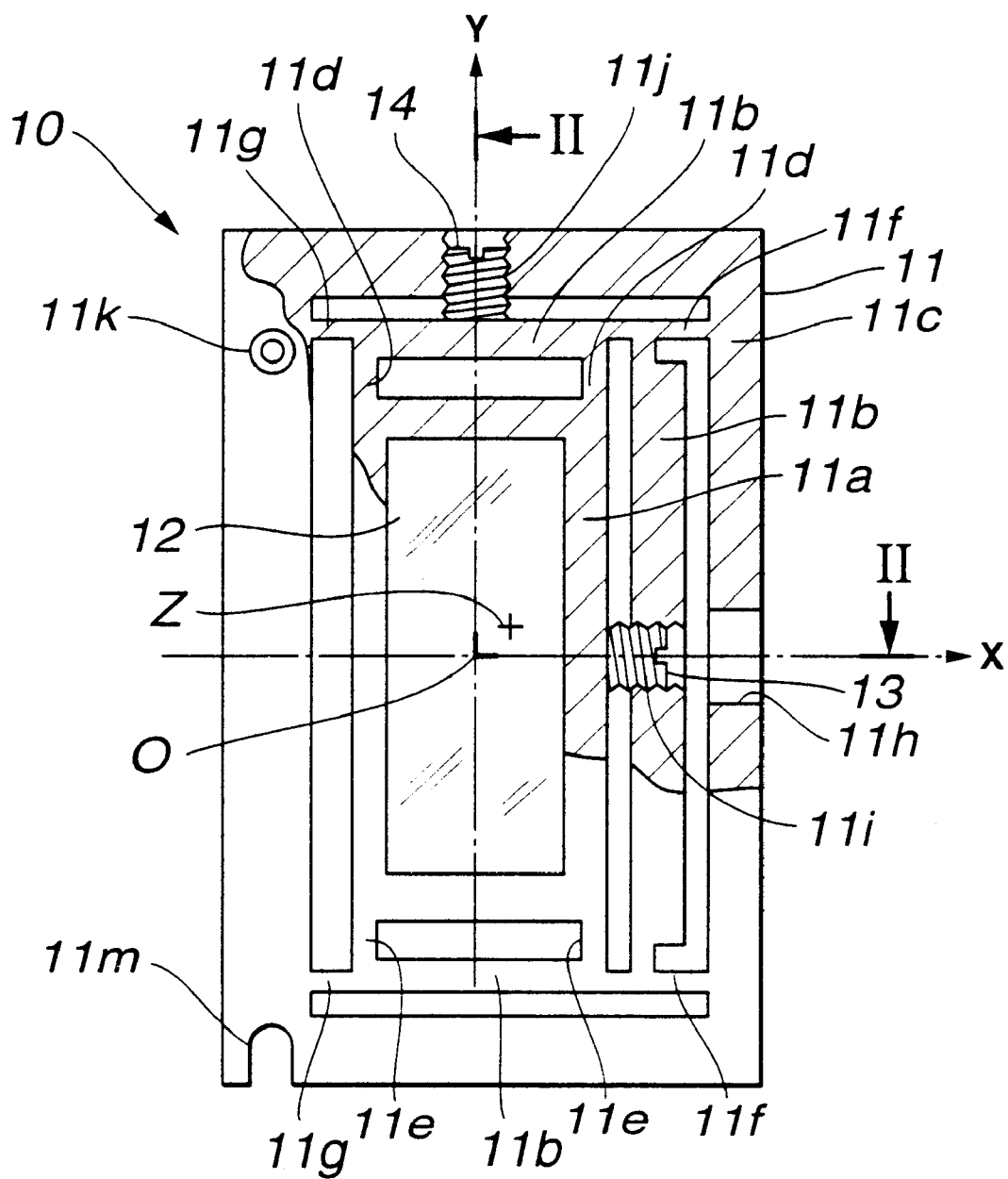
FIG. 5 is a plan view illustrating a lens frame that is a second embodiment of the lens barrel of the present invention.
Figure 6:
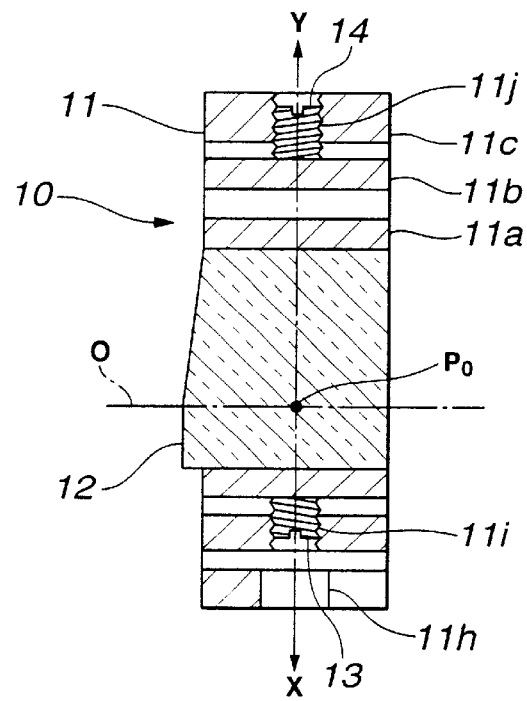
FIG. 6 is a sectional view taken on line II-O-II of FIG. 5.
Figure 7:
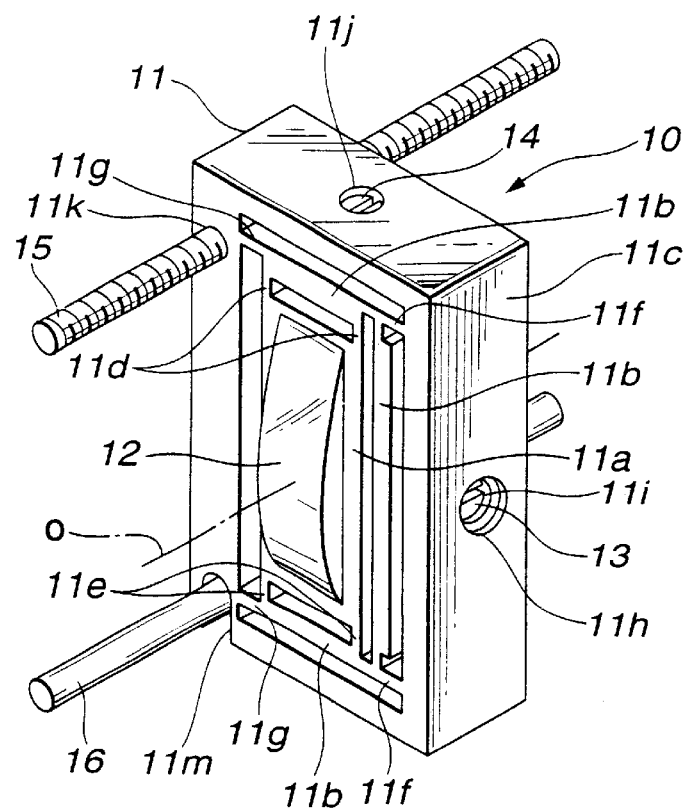
FIG. 7 is a perspective view showing a state in which a feed screw and a guide shaft are fitted into the lens frame of the second embodiment.

FIG. 5 is a plan view of the lens frame that is the second embodiment. Further, FIG. 6 is a sectional view taken on line II-O-II of FIG. 5. FIG. 7 is a perspective view of this lens in a state in which a feed screw and a guide shaft are fitted thereinto.

A lens frame 10 of this embodiment is a lens barrel, or a lens frame adapted so that the position of an optical system incorporated into optical equipment is adjustable. The lens frame 10 consists mainly of a lens frame body 11, and a prism lens 12, which serves as an optical member (namely, an optical device) held in the lens frame body. When this lens frame is incorporated into the optical equipment, this lens frame is supported by a feed screw 15 and a guide shaft 16 in such a way as to be able to proceed and retreat in the direction of the optical axis O, as illustrated in FIG. 7.

Similarly with the lens frame 9, the lens frame 10 is adapted so that the fine adjustment of the optical system position of the lens 12, namely, the optical axis position of the lens 12 with respect to the lens frame body 11 can be performed. Incidentally, in the case of this embodiment, adjustment references for adjustment of the optical axis position O are the position of a female screw portion 11k, into which the feed screw 15 is screwed, and the position of a notch portion 11m, into which the guide shaft 16 is fitted.

Incidentally, let "X-axis" and "Y-axis" respectively denote axes, which are perpendicular to the optical axis O of the lens 12 and orthogonal to each other and which pass through the center $P_0$ in the direction of the optical axis of the lens 12 and correspond to horizontal and vertical directions.

The lens frame body 11 is an integral member in which a connecting portion (to be described later) connects the following frames 11a, 11b, 11c, that is, a rectangular inner frame 1a serving as a holding member for holding the lens 12, a channel-like intermediate frame 11b serving as a first support frame disposed so that the frame 11b surrounds the outer periphery of the inner frame 1a and that a gap is formed between the frames 11a and 11b, and a rectangular outer frame 11c disposed so that the frame 11c surrounds the outer periphery of the intermediate frame 11b and that a gap is formed between the frames 11b and 11c.

The inner frame 11a and the intermediate frame 11b are connected by parallel spring portions 11d and 11e, which are formed in such a way as to be integral with these frames 11b and 11c, and which are two deformable rectangular plate-like opposed first connecting portions extending upwardly and downwardly at both sides of Y-axis.

Further, the inner frame 11a and the intermediate frame 11b are connected by parallel spring portions 11f and 11g, which are formed in such a way as to be integral with these frames 11b and 11c, and which are two deformable opposed plate-like second connecting portions extending laterally at both sides of X-axis.

Incidentally, it is assumed that the parallel spring portions 11d and 11e can elastically deform in the direction of X-axis, while the parallel spring portions 11f and 11g can elastically deform in the direction of Y-axis. Further, these parallel springs respectively have shapes, which are nearly symmetrical with respect to a plane containing X-axis and Y-axis. The distribution of the stiffness of each of the parallel spring portions is nearly symmetrical with respect to X-axis or Y-axis.

Thus, when these parallel springs are pushed by adjustment screws through screw abutting portions in corresponding directions, the inner frame 11a or the intermediate frame 11b is deformed in such a way as to perform translation (parallel displacement) without being inclined to the optical axis O. Moreover, when the deformation is caused, the lens 12, which is a prism lens, is prevented from causing a rotational displacement around the optical axis O.

In the intermediate frame 11b, a female screw portion 11i is provided on X-axis. Similarly, in the outer frame 11c, a female screw portion 11j, a female screw portion 11k, into which a feed screw 15 is screwed, and a notch portion 11m are provided on Y-axis.

A first adjustment screw 13 serving as a first adjusting member is screwed into the female screw portion 11i of the intermediate frame 11b through the opening 11h.

Further, an adjustment screw 14 serving as a second adjusting member is screwed into the female screw portion 11j of the outer frame 11c. Incidentally, the adjustment screws 13 and 14 are slotted machine screws.

Additionally, the initial lens optical axis position Z is set in such a way as to be slightly rightwardly and upwardly eccentric from the position of an optical axis O, which is an adjustment target position, as viewed in FIG. 5, similarly as in the case of the first embodiment.

Next, an optical system position adjusting operation of the lens frame 10 of the second embodiment constructed as described above will be described hereinbelow.

First, when the lens frame 10 is adjusted, the lens frame 10 is supported by screwing the feed screw 15 into the female screw portion 11k, and by inserting the guide shaft 16 into the notch portion 11m, as illustrated in FIG. 7, in a state in which the lens 12 is inserted thereinto.

Then, adjustment screws 13 and 14 are inserted into the female screw portions 11i and 11j. Similarly as in the case of the first embodiment, the adjustment screws 13 and 14 are screwed thereinto by simultaneously observing a detection signal generated by a point light source portion and an optical-axis detecting CCD portion provided in the adjustment jig. Thus, the adjustment of the initial lens optical is performed by causing a micro-movement of the initial lens optical axis position Z to the adjustment target position of the optical axis O. Thereafter, the adjustment screws 13 and 14 are fixed to the female screw portions 11i and 11j by adhesives. Then, the adjustment of the optical axis position Z is finished.

Incidentally, the movement of the optical axis position Z at the time of the adjustment thereof is realized by deforming the parallel spring portions 11d, and 11e in the direction of X-axis, and deforming the parallel spring portions 11f and 11g in the direction of Y-axis. Similarly as in the case of the first embodiment, this deformation is synthesized from bending strain, which is caused due to the bending moment of the parallel spring portion, and shearing strain, which is caused owing to the hearing force thereof.

As described above, the lens frame 10 of the second embodiment has effects similar to those of the lens frame 9. Especially, the second embodiment can be applied to a lens frame employing the prism lens 12. Consequently, the adjustment of the position of the optical system is achieved with high optical accuracy in a state in which the rotational displacement and inclination of the prism lens 12 are not caused.

Next, a lens frame, which is a lens barrel that is a third embodiment of the present invention, will be described hereunder.

Figure 8:
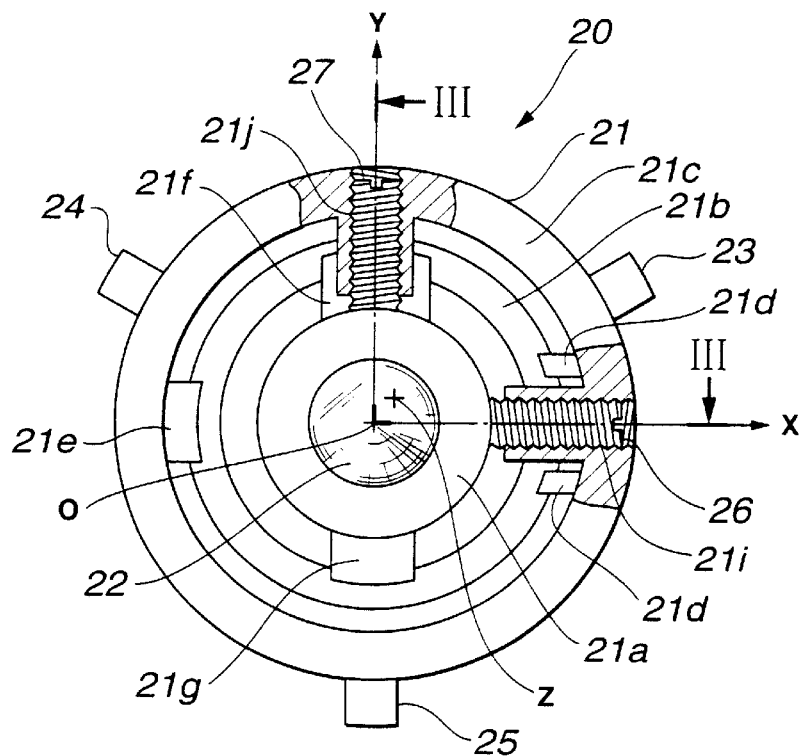
FIG. 8 is a plan view illustrating a lens frame that is a third embodiment of the lens barrel of the present invention.
Figure 9:
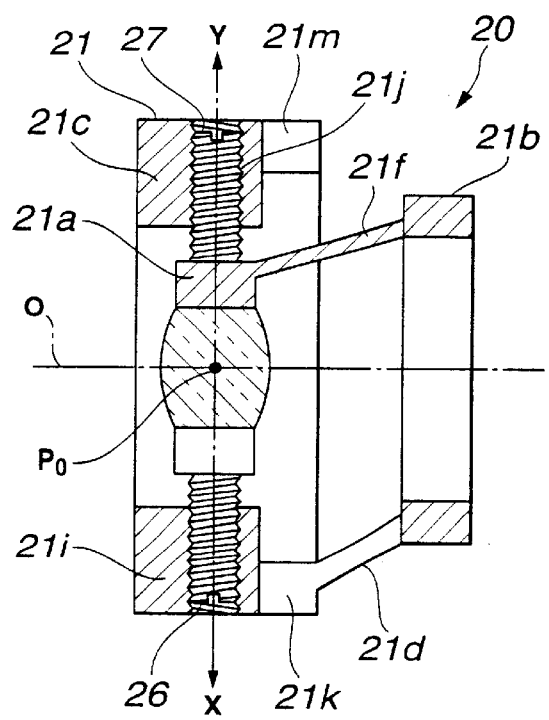
FIG. 9 is a sectional view taken on line III-O-III of FIG. 8.
Figure 10:
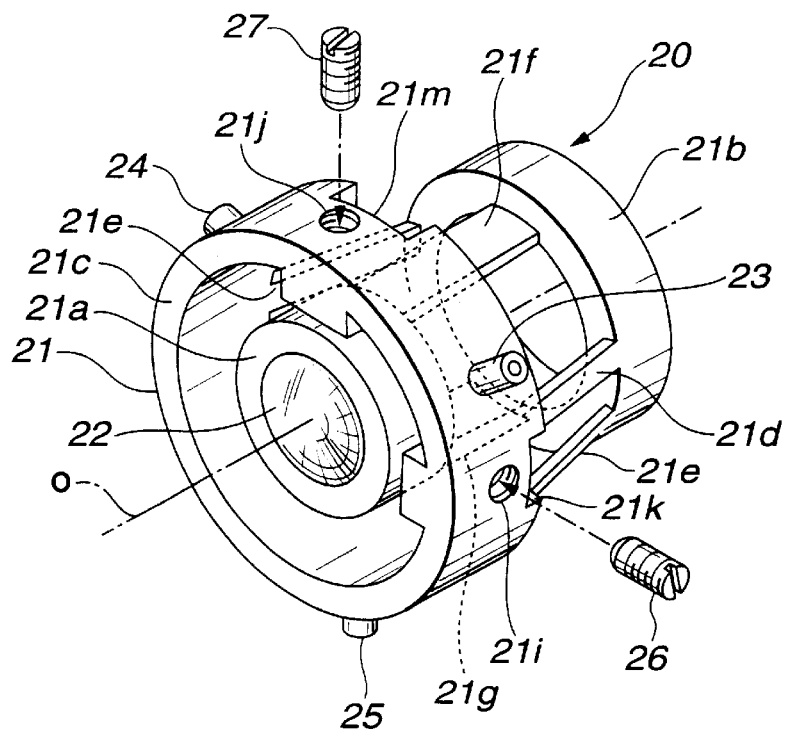
FIG. 10 is an exploded perspective view of the lens frame of the third embodiment.

FIG. 8 is a plan view of the lens frame that is the third embodiment. Further, FIG. 9 is a sectional view taken on line III-O-III of FIG. 8. FIG. 10 is an exploded perspective view of this lens frame.

A lens frame 20 of this embodiment is a lens barrel, or a lens frame adapted so that the position of an optical system incorporated into optical equipment is adjustable. This lens frame is applied to a case that there is sufficient room in the direction of the optical axis. This lens frame 20 consists mainly of a lens frame body 21, and a lens 22, which serves as an optical member (namely, an optical device) held in the lens frame body, and cam followers 23, 24, and 25. This lens frame 20 is adapted so that the fine adjustment of the optical system position of the lens 22, namely, the movement of the optical axis position Z of the lens 22 with respect to the lens frame body 21 to the lens optical axis position O, which is an adjustment target position, can be performed. Incidentally, an adjustment reference for adjustment of the optical axis position is an outside-diameter portion of the lens frame body 21.

Incidentally, let "X-axis" and "Y-axis" respectively denote axes, which are perpendicular to the optical axis O of the lens 22 and orthogonal to each other and which pass through the center $P_O$ in the direction of the optical axis of the lens 22 and correspond to horizontal and vertical directions.

The lens frame body 21 is an integral member in which a connecting portion (to be described later) connects the following frames 21a, 21b, 21c, that is, a ring-like inner frame 21a serving as a holding member for holding the lens 22, a ring-like intermediate frame 21b serving as a first support frame disposed so that the frame 21b surrounds the outer periphery of the inner frame 21a and that a gap is formed between the frames 21a and 21b, and a ring like outer frame 21c disposed so that the frame 21c surrounds the outer periphery of the intermediate frame 21b and that a gap is formed between the frames 21b and 21c. Incidentally, the cam followers 23, 24, and 25 are securely fixed at positions at which the outer circumference of the outer frame 21c is trisected.

The inner frame 21a and the intermediate frame 21b are connected by parallel spring portions 21d and 21e, which are formed in such a way as to be integral with these frames 21b and 21c, and which are two laterally deformable plate-like first connecting portions extending rearwardly along a plane containing the optical axis O and X-axis. Incidentally, the spring portion 21d is divided into two parts arranged in an upward or downward direction.

Further, the intermediate frame 21b and the outer frame 21c are connected by parallel spring portions 21f and 21g, which are formed in such a way as to be integral with these frames 21b and 21c, and which are two deformable plate-like second connecting portions extending backwardly along a plane containing the optical axis O and Y-axis.

Incidentally, it is assumed that the parallel spring portions 21d and 21e can elastically deform in the direction of X-axis, while the parallel spring portions 21f and 21g can elastically deform in the direction of Y-axis. Further, these parallel springs are formed in such a way as to be relatively elongated in a direction in which these spring portions extend. Thus, when the inner frame 21a is pushed by the adjustment screws (to be described later) in the direction of X-axis or Y-axis, the spring portions deform so that the inner frame 21a performs translation (parallel displacement) without being inclined to the optical axis O.

In the outer frame 21c, a female screw portion 21i is provided on X-axis. A female screw portion 21j is provided on Y-axis. A first adjustment screw 26 serving as a first adjusting member is screwed into the female screw portion 21i. Further, an adjustment screw 27 serving as a second adjusting member is screwed into the female screw portion 21j. Incidentally, the adjustment screws 26 and 27 are slotted machine screws.

Additionally, in the case of the lens frame 20 of this embodiment, the initial lens optical axis position Z is set in such a way as to be slightly rightwardly and upwardly eccentric from the position of an optical axis O, which is an adjustment target position, as viewed in FIG. 8, similarly as in the case of the first embodiment. The reason for setting the eccentricity amount in such a manner is similar to that in the case of the first embodiment. That is, the reason is that the adjustment should be performed in a state in which the adjustment screws are abutted against the abutting portion.

Next, an optical system position adjusting operation of the lens frame 20 of the third embodiment constructed as described above will be described hereinbelow.

First, the outer periphery of the outer frame 21c of the lens frame body 21, to which the lenses 22 and the cam followers 23, 24, and 25 are fitted, is held by an adjustment jig. Then, adjustment screws 26 and 27 are inserted into the female screw portions 21i and 21j. Subsequently, the adjustment screws 26 and 27 are screwed thereinto by simultaneously observing a detection signal generated by a point light source portion and an optical-axis detecting CCD portion provided in the adjustment jig.

Thus, the adjustment of the initial lens optical is performed by causing a micro-movement of the initial lens optical axis position Z to the adjustment target position of the optical axis O. Thereafter, the adjustment screws 26 and 27 are fixed to the female screw portions 21i and 21j by adhesives. Then, the adjustment of the optical axis position Z is finished.

As described above, the lens frame 20 of the third embodiment has advantageous effects similar to those of the first embodiment. Especially, the spring portion serving as a connecting portion is relatively elongated in a direction, in which the spring portion extends. Thus, the adjustment is accurately achieved in a wide range of the position of the lens optical axis O.

Next, a lens frame, which is a lens barrel that is a fourth embodiment of the present invention, will be described hereunder.

Figure 11:
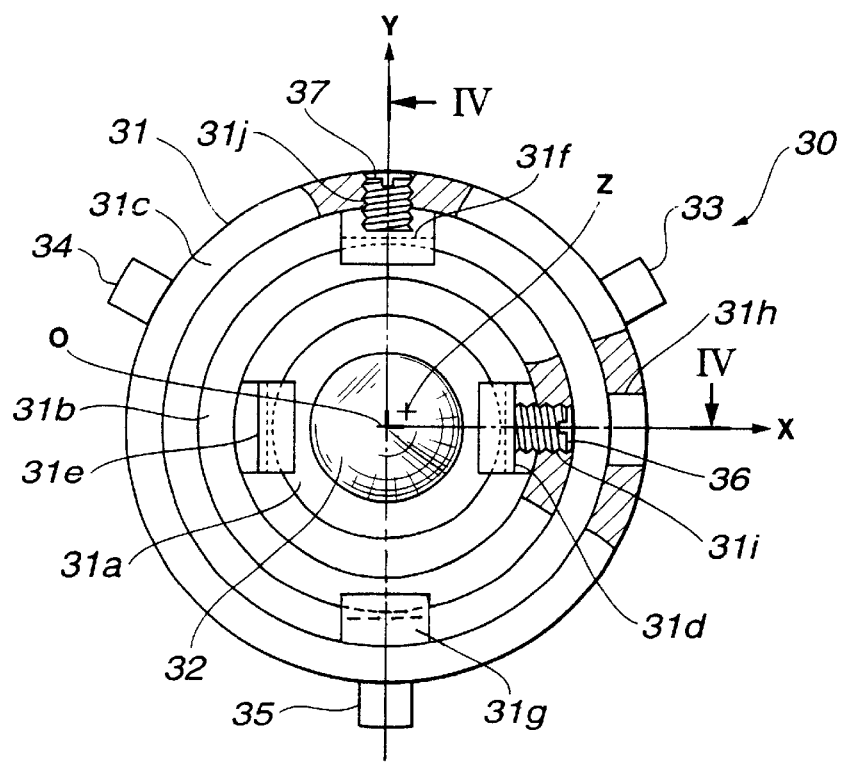
FIG. 11 is a plan view illustrating a lens frame that is a fourth embodiment of the lens barrel of the present invention.
Figure 12:
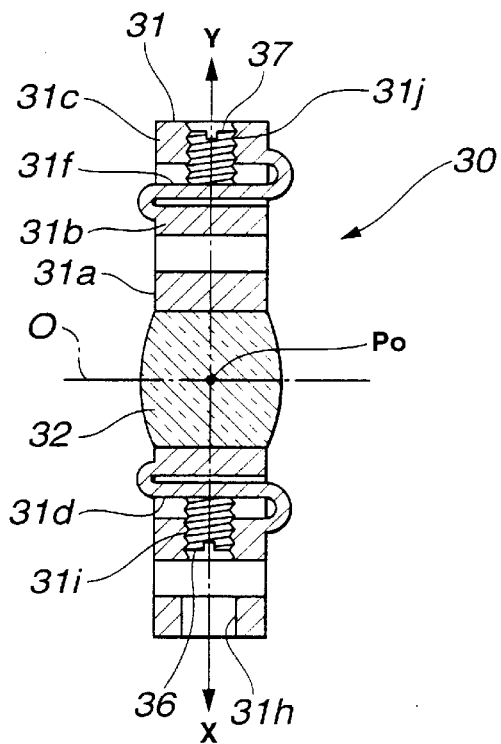
FIG. 12 is a sectional view taken on line IV-O-IV of FIG. 11.
Figure 13:
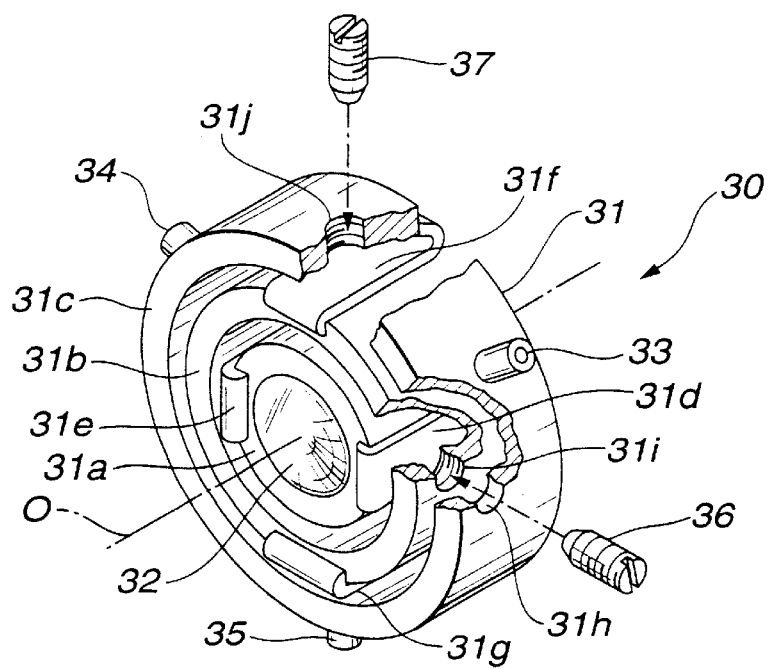
FIG. 13 is an exploded perspective view of the lens frame of the fourth embodiment.

FIG. 11 is a plan view of the lens frame that is the fourth embodiment. Further, FIG. 12 is a sectional view taken on line IV-O-IV of FIG. 11. FIG. 13 is an exploded perspective view of this lens frame.

A lens frame 30 of this embodiment is a lens barrel, or a lens frame adapted so that the position of an optical system incorporated into optical equipment is adjustable. This lens frame 30 consists mainly of a lens frame body 31, and a lens 32, which serves as an optical member (namely, an optical device) held in the lens frame body, and cam followers 33, 34, and 35. This lens frame 30 is adapted so that the adjustment of the optical system position of the lens 32, namely, the adjustment of the movement of the optical axis position Z of the lens 32 with respect to an adjustment reference (for example, an outside-diameter portion of the outer frame 31c) for the lens frame body 31 to the lens optical axis position O, which is an adjustment target position, can be performed.

Incidentally, let "X-axis" and "Y-axis" respectively denote axes, which are perpendicular to the optical axis O of the lens 32 and orthogonal to each other and which pass through the center $P_O$ in the direction of the optical axis of the lens 32 and correspond to horizontal and vertical directions.

The lens frame body 31 is an integral member in which a connecting portion (to be described later) connects the following frames 31a, 31b, 31c, that is, a ring-like inner frame 31a serving as a holding member for holding the lens 32, a ring-like intermediate frame 31b serving as a first support frame disposed so that the frame 31b surrounds the outer periphery of the inner frame 31a and that a gap is formed between the frames 31a and 31b, and a ring like outer frame 31c disposed so that the frame 31c surrounds the outer periphery of the intermediate frame 31b and that a gap is formed between the frames 31b and 31c. Incidentally, the cam followers 33, 34, and 35 are securely fixed at positions at which the outer circumference of the outer frame 31c is trisected.

The inner frame 31a and the intermediate frame 31b are connected by parallel spring portions 31d and 31e, which are formed in such a way as to be integral with these frames 31b and 31c, and which are deformable bending band-like first connecting portions that extend from laterally arranged positions on X-axis and on the front side of the inner frame 31a through the gap between the frames 31a and 31b and are connected to the rear face of the intermediate frame 31b.

Further, the intermediate frame 31b and the outer frame 31c are connected by parallel spring portions 31f and 31g, which are formed in such a way as to be integral with these frames 31b and 31c, and which are two deformable band-like second connecting portions that extend from upwardly or downwardly arranged positions on Y-axis and on the front side of the intermediate frame 31b through the gap between the frames 31b and 31c and are connected to the back face of the outer frame 31c.

Incidentally, it is assumed that the parallel spring portions 31d and 31e can elastically deform in the direction of X-axis, while the parallel spring portions 31f and 31g can elastically deform in the direction of Y-axis. Further, the parallel springs 31d, 31e or 31f, 31g have shapes that are symmetrical with respect to a plane containing X-axis and Y-axis. The spring portions are formed so that when the abutting parts provided on the spring portions are pushed by the adjustment screws (to be described later) in the corresponding directions, the inner frame 31a or the intermediate frame 31b performs translation (parallel displacement) without being inclined to the optical axis O.

In the intermediate frame 31b, a female screw portion 31i is provided on X-axis. In the outer frame 31c, an adjustment opening 31h is provided at a place opposed to the position of the female screw portion. Further, in the outer frame 31c, a female screw portion 31j is provided on Y-axis.

An adjustment screw 36 serving as a first adjusting member being capable of abutting against the spring portion 31d is screwed into the female screw portion 31i. Further, an adjustment screw 37 serving as a second adjusting member capable of abutting against the spring portion 31f is screwed into the female screw portion 31j. Incidentally, the adjustment screws 36 and 37 are slotted machine screws.

In the case of the lens frame 30 of this embodiment, the initial lens optical axis position Z is set in such a way as to be slightly rightwardly and upwardly eccentric from the position of an optical axis O, which is an adjustment target position, as viewed in FIG. 11, similarly as in the case of the first embodiment. The reason for setting such an eccentricity amount in such a manner is similar to that in the case of the first embodiment. That is, the reason is that the adjustment should be performed in a state in which the adjustment screws are abutted against the abutting portion.

Next, an optical system position adjusting operation of the lens frame 30 of the fourth embodiment constructed as described above will be described hereinbelow.

First, the outer periphery of the outer frame 31c of the lens frame body 31, to which the lenses 32 and the cam followers 33, 34, and 35 are fitted, is held by an adjustment jig. Then, adjustment screws 36 and 37 are inserted into the female screw portions 31i and 31j. Subsequently, the adjustment screws 36 and 37 are screwed thereinto by simultaneously observing a detection signal generated by a point light source portion and an optical-axis detecting CCD portion provided in the adjustment jig. Thus, the adjustment of the initial lens optical is performed by causing a micromovement of the initial lens optical axis position Z to the adjustment target position of the optical axis O. Thereafter, the adjustment screws 36 and 37 are fixed to the female screw portions 31i and 31j by adhesives. Then, the adjustment of the optical axis position Z is finished. Incidentally, the adjustment may be performed by incorporating the lens frame 30 into the lens barrel portion of the optical equipment.

As described above, the lens frame 30 of the fourth embodiment has advantageous effects similar to those of the lens frame 9 of the first embodiment. Especially, each of the spring portions serving as connecting portions employs a shape that is easily deformed. Thus, the adjustment of the optical system is accurately achieved in a wide range of the position of the lens optical axis O.

As described above, according to the first to fourth embodiments of the present invention, there are provided lens frames in which the optical system position adjustment of the optical members (namely, the centering thereof) is easily performed.

Next, a lens frame, which is a lens barrel of a fifth embodiment of the present invention, will be described hereinbelow.

Figure 14:
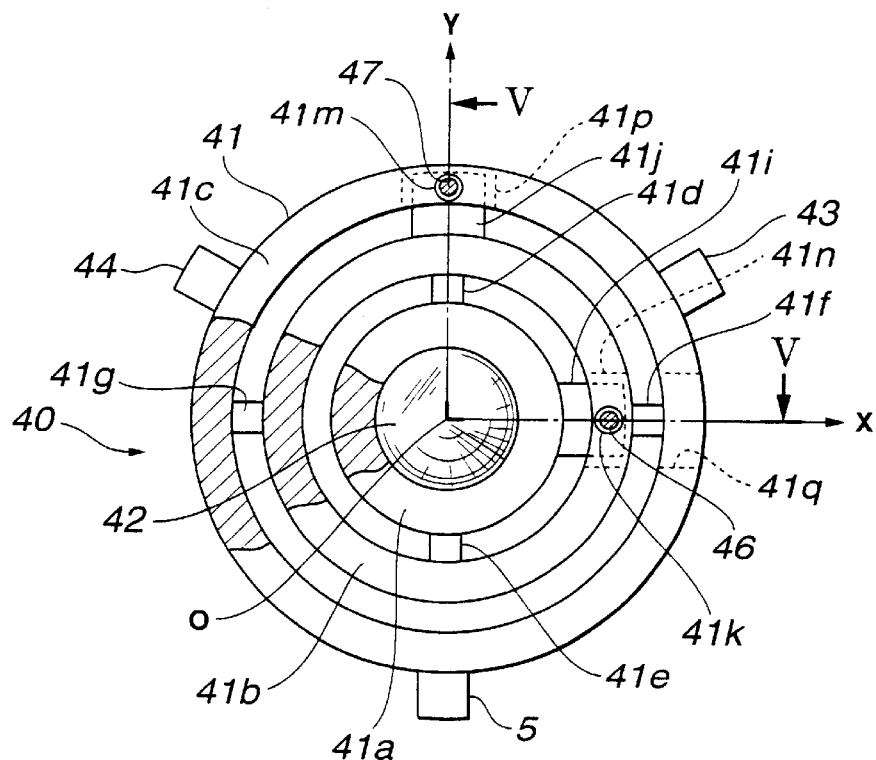
FIG. 14 is a plan view illustrating a lens frame that is a fifth embodiment of the lens barrel of the present invention.
Figure 15:
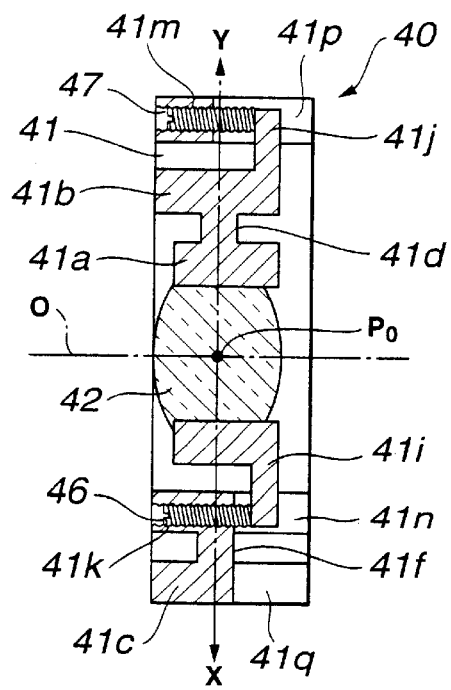
FIG. 15 is a sectional view taken on line V-O-V of FIG. 14.
Figure 16:
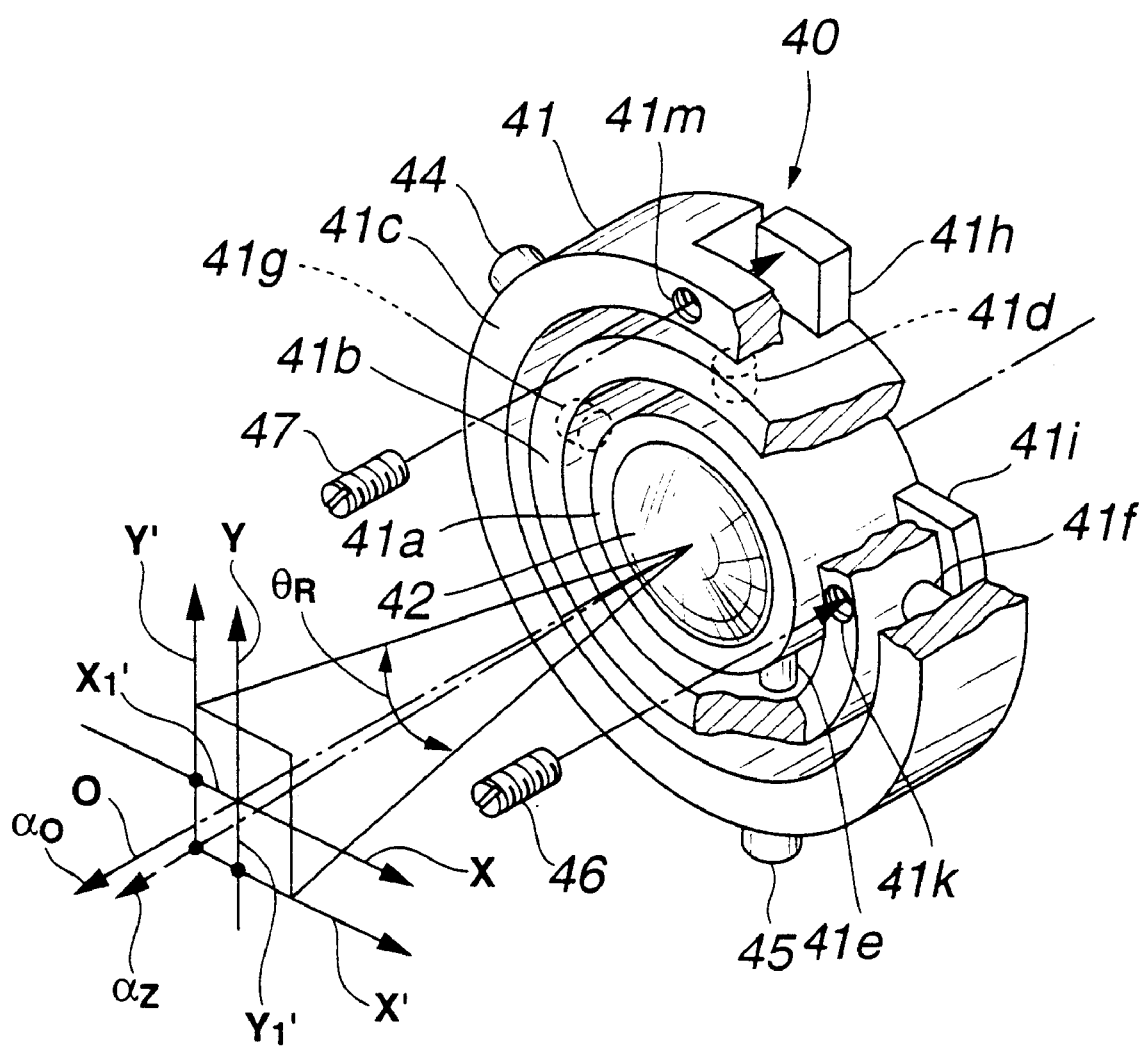
FIG. 16 is an exploded perspective view of the lens frame of the fifth embodiment.

FIG. 14 is a plan view of the lens frame that is the fifth embodiment. Further, FIG. 15 is a sectional view taken on line V-O-V of FIG. 14. FIG. 16 is an exploded perspective view of this lens frame.

A lens frame 40 of this embodiment is a lens barrel, or a lens frame adapted so that the posture of an optical system incorporated into optical equipment is adjustable.

Further, the lens frame 40 consists mainly of a lens frame body 41, a lens 42, which serves as an optical member (namely, an optical device) held in the lens frame body, and cam followers 43, 44, and 45 securely fixed on the periphery of the lens frame 41.

This lens frame 40 is adapted so that the fine adjustment of the optical system posture of the lens 42, namely, the inclination of the optical axis O of the lens 42 with respect to the lens frame body 41 can be performed. Incidentally, in the case of this embodiment, an adjustment reference for adjustment of the optical axis posture is the outermost diameter (namely, the outside-diameter portion of the outer frame 41c (to be described later)) of the lens frame body 41, and is selected according to a condition in which the lens frame is mounted in the optical equipment.

Incidentally, let "X-axis" and "Y-axis" respectively denote axes, which are perpendicular to the optical axis O of the lens 42 and orthogonal to each other and which pass through the center $P_0$ in the direction of the optical axis of the lens 42 and correspond to horizontal and vertical directions. Further, a point of intersection between X-axis and Y-axis is set to be a point of intersection among the axes of cylindrical portions 41d, 41e, 41f, and 41g, and denoted by "$P_0$". Moreover, it is supposed that the surface side of the lens frame 40 on FIG. 14 (which corresponds to the left-hand side thereof, as viewed in FIG. 15) is the "front side" thereof, and that the back side thereof on FIG. 14 (which corresponds to the right-hand side thereof, as viewed in FIG. 15) is the "rear side" thereof.

The lens frame body 41 is an integral member in which a connecting portion (to be described later) connects the following frames 41a, 41b, 41c, that is, a ring-like inner frame 41a serving as a holding member for holding the lens 42, a ring-like intermediate frame 41b serving as a first support frame disposed so that the frame 41b surrounds the outer periphery of the inner frame 41a and that a gap is formed between the frames 41a and 41b, and a ring like outer frame 41c disposed so that the frame 41c surrounds the outer periphery of the intermediate frame 41b and that a gap is formed between the frames 41b and 41c. Incidentally, the cam followers 43, 44, and 45 are securely fixed at positions at which the outer circumference of the outer frame 41c is trisected.

The inner frame 41a and the intermediate frame 41b are connected by cylindrical portions 41d and 41e, which are formed in such a way as to be integral with these frames 41b and 41c, and which are torsionally deformable first connecting portions extending upwardly and downwardly on Y-axis.

Further, the intermediate frame 41b and the outer frame 41c are connected by cylindrical portions 41f and 41g, which are formed in such a way as to be integral with these frames 41b and 41c, and which are torsionally deformable second connecting portions extending laterally on X-axis. Incidentally, the cylindrical portions 41d, 41e and 41f, 41g are disposed on Y-axis or along X-axis in such a manner as to be symmetric with the optical axis center.

Further, in the intermediate frame 41b, a female screw portion 41k and a notch portion 41m are provided on the right-hand side, as viewed in FIG. 14, and arranged in a direction parallel to the optical axis O and across X-axis. Furthermore, in the outer frame 41c, a female screw portion 41m and a notch portion 41p are provided on the upper side of the frame, as viewed in this figure, and arranged in a direction parallel to the optical axis O and across Y-axis. Moreover, a notch portion 41q (which is necessary for forming the lens frame 40) is provided in an outwardly radial direction of the notch portion 41n.

A first adjustment screw 46 serving as a first adjusting member is screwed into the female screw portion 41k of the intermediate frame 41b through the opening 41h. Further, an adjustment screw 47 serving as a second adjusting member is screwed into the female screw portion 41m of the outer frame 41c. Incidentally, the adjustment screws 46 and 47 are slotted machine screws.

Furthermore, the inner frame 41a is provided with a plate-like projection portion 41i, which serves as a pressed portion projecting in the direction of X-axis to a place opposed to the female screw portion 41k of the intermediate frame 41b, in a right-hand side part of the outer peripheral portion thereof. Further, similarly, the intermediate frame 41b is provided with a plate-like projection portion 41j, which serves as a pressed portion projecting in the direction of X-axis to a place opposed to the female screw portion 41m of the outer frame 41c and upwardly from the outer peripheral portion thereof.

The plate-like projection portions 41i and 41j can be pressed by the adjustment screws 46 and 47 screwed from a direction parallel to the optical axis O. When the plate-like projection portions 41i and 41j are pressed in the direction of the optical axis O, a direction (or inclination) α indicating the optical system position (or posture) of the optical axis of the lens 22 changes.

Incidentally, an initial direction $α_z$ of the optical axis of the lens 42 (namely, the inclination thereof in an initial state) is set so that the direction of the point of intersection of X'-axis and Y'-axis is deviated from the direction $α_0$ (namely, the degree of inclination is 0) of an optical axis O, which is an adjustment target position, as viewed in FIG. 16, and that X'-intercept is $X_1'$, which is negative, and Y'-intercept is $Y_1'$, which is negative, on X'Y'-plane. Additionally, X'-axis and Y'-axis are obtained by translation of X-axis and Y-axis along the optical axis O, respectively.

Further, in this figure, an angle $θ_R$ formed between two lateral edges of a quadrangular prism having a lateral edge extending in the initial direction $α_z$ of the optical axis indicates an adjustment range (or adjustment limit). When the adjustment is performed within this adjustment range $θ_R$, a state, in which the end faces of the screwed adjustment screws 46 and 47 are abutted against the plate-like projection portions 41i and 41j, is maintained. Moreover, the cylindrical portions 41d, 41e, 41f and 41g deform within a natural range. Consequently, high-accuracy adjustment can be achieved.

Next, an optical system inclination adjusting operation of the lens frame 40 of the fifth embodiment constructed as described above will be described hereinbelow.

First, when the lens frame 40 is adjusted singly, the outer periphery of the outer frame 41c of the lens frame body 41, to which the lenses 42 and the cam followers 43, 44, and 45 are fitted, is held by an adjustment jig. Then, adjustment screws 46 and 47 are inserted into the female screw portions 41k and 41m. The adjustment screws 46 and 47 are screwed thereinto from a direction parallel to the direction of the optical axis by simultaneously observing a detection signal generated by a point light source portion and an optical-axis detecting CCD portion provided in the adjustment jig. Thus, the cylindrical portions 41d, 41e, 41f, and 41g are deformed so that the optical axis is swung. Consequently, the initial lens optical axis direction $\alpha_z$ is adjusted and changed into the adjustment target direction $\alpha_0$ of the optical axis O. During the adjustment, the cylindrical portions 41d, 41e, or 41f, 41g are simply distorted, and the center $P_0$ hardly moves, because the cylindrical portions are disposed on Y-axis and X-axis in a symmetrical manner, as described above.

Upon completion of the adjustment, the adjustment screws 46 and 47 are fixed to the female screw portions 41i and 41j by adhesives. Then, the adjustment is finished.

Figure 17:
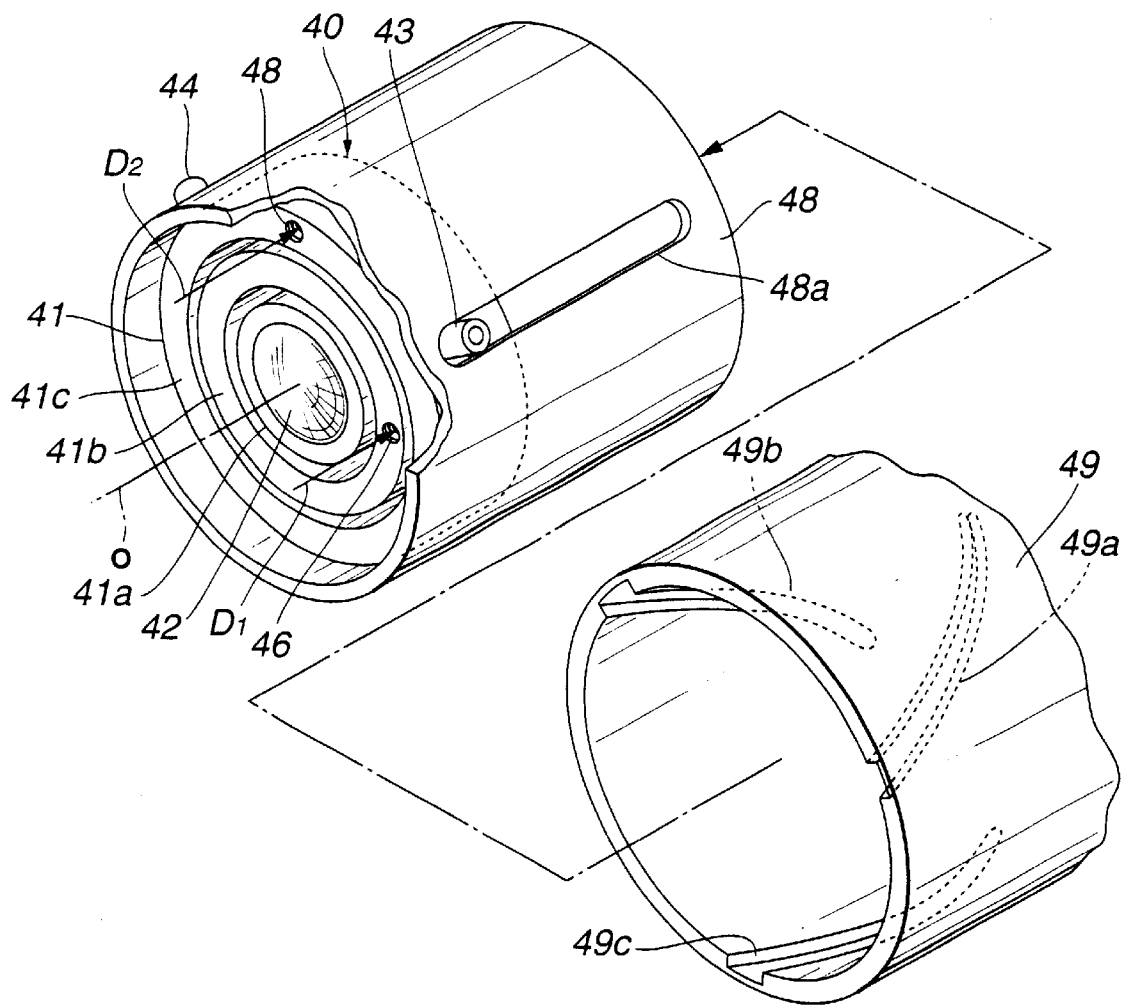
FIG. 17 is an exploded perspective view of the lens frame of the fifth embodiment in which a cam ring is incorporated.

Furthermore, as illustrated in the exploded perspective diagram of FIG. 17, in the case that the adjustment of the lens frame 40 is performed in a state in which the frame 40 is incorporated into a rectilinear cam ring 48 or a rotational cam ring 49, the lens frame body 41, into which the lens 42 is incorporated, is mounted in the rectilinear cam ring 48. Moreover, the cam followers 43, 44, and 45 are inserted into guide grooves 48a, 48b, and 48c, respectively. Thus, the lens frame 40 is securely fixed to the outer frame 41c. Furthermore, the cam followers 43, 44, and 45 are fitted into the cam grooves 49a, 49b, and 49c, respectively, so that the rotational cam ring 49 is mounted in the rectilinear cam ring 48. In such a state, the adjustment is performed by regulating the screwing depth of the adjustment screws to be screwed from the direction parallel to the optical axis O, similarly as in the case of adjusting the aforementioned lens frame singly.

As described above, in the case of the lens frame 40 of the fifth embodiment, the lens frame body 41 has an integral structure, and thus has a simple configuration. Moreover, the adjustment of the inclination of the lens optical axis direction $\alpha$ is performed by screwing two adjustment screws from the direction of the optical axis O. Therefore, needless to say, when the single lens frame is used, and even when a cam ring mounting state, the adjustment is easily achieved without providing adjustment openings therein. In addition, the cylindrical portions deform at the time of the adjustment and are disposed on X-axis or Y-axis, so that even when the adjustment of the inclination of the optical axis is performed, the position of the cylindrical portions hardly change. Consequently, a high-optical-accuracy lens frame is obtained.

Incidentally, in the case of the lens frame 40 of this embodiment, the cylindrical portions 41d, 41e or 41f, 41g cause mainly elastic distortion around X-axis or Y-axis during the adjustment. However, if readjustment of the lens frame is not performed, the cylindrical portions may utilize not only elastic deformation but also plastic deformation.

Furthermore, prism-like portions placed along Y-axis or X-axis may be employed instead of the cylindrical portions 41d, 41e, 41f, and 41g. Further, the lens frame body 41 does not always have an integral structure. For instance, the lens frame may employ a structure in which the inner frame 41a, 41b, and 41c are formed in such a way as to be separated by the cylindrical portions serving as the connecting portions, and each of the cylindrical portions is fitted into a corresponding frame element. In this case, there is the necessity for the conditions in which the adjustment screws are provided in the adjustment jig instead of the lens frame, and that the fitting portions of the cylindrical portions are bonded and fixed after the adjustment.

Further, even if the lens 42 and the lens frame body 41 are formed in such a way as to be integral with each other, the optical system posture adjusting structure of the aforementioned embodiment may be applied to such a lens frame. Additionally, screws having locking functions may be employed as the adjustment screws 46 and 47. This eliminates the need for an adhesion operation performed in the aforementioned embodiment after the adjustment.

Next, a lens frame, which is a lens barrel of a sixth embodiment of the present invention, will be described hereinbelow.

Figure 18:
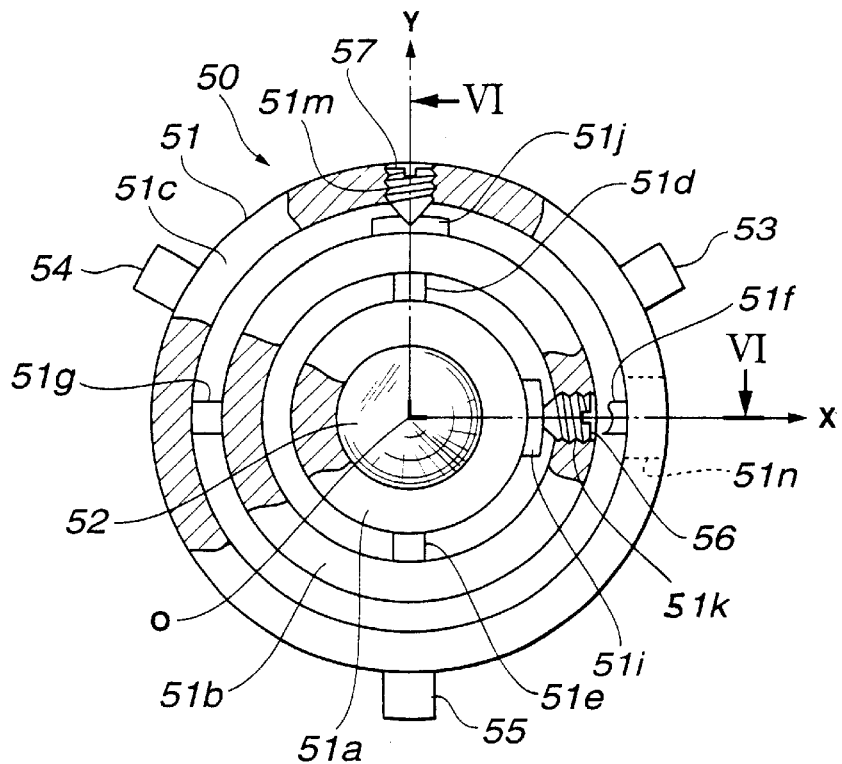
FIG. 18 is a plan view illustrating a lens frame that is a sixth embodiment of the lens barrel of the present invention.
Figure 19:
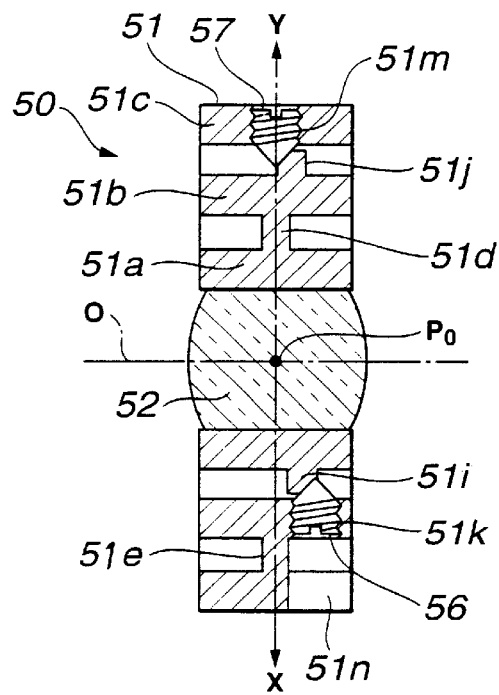
FIG. 19 is a sectional view taken on line VI-O-VI of FIG. 18.
Figure 20:
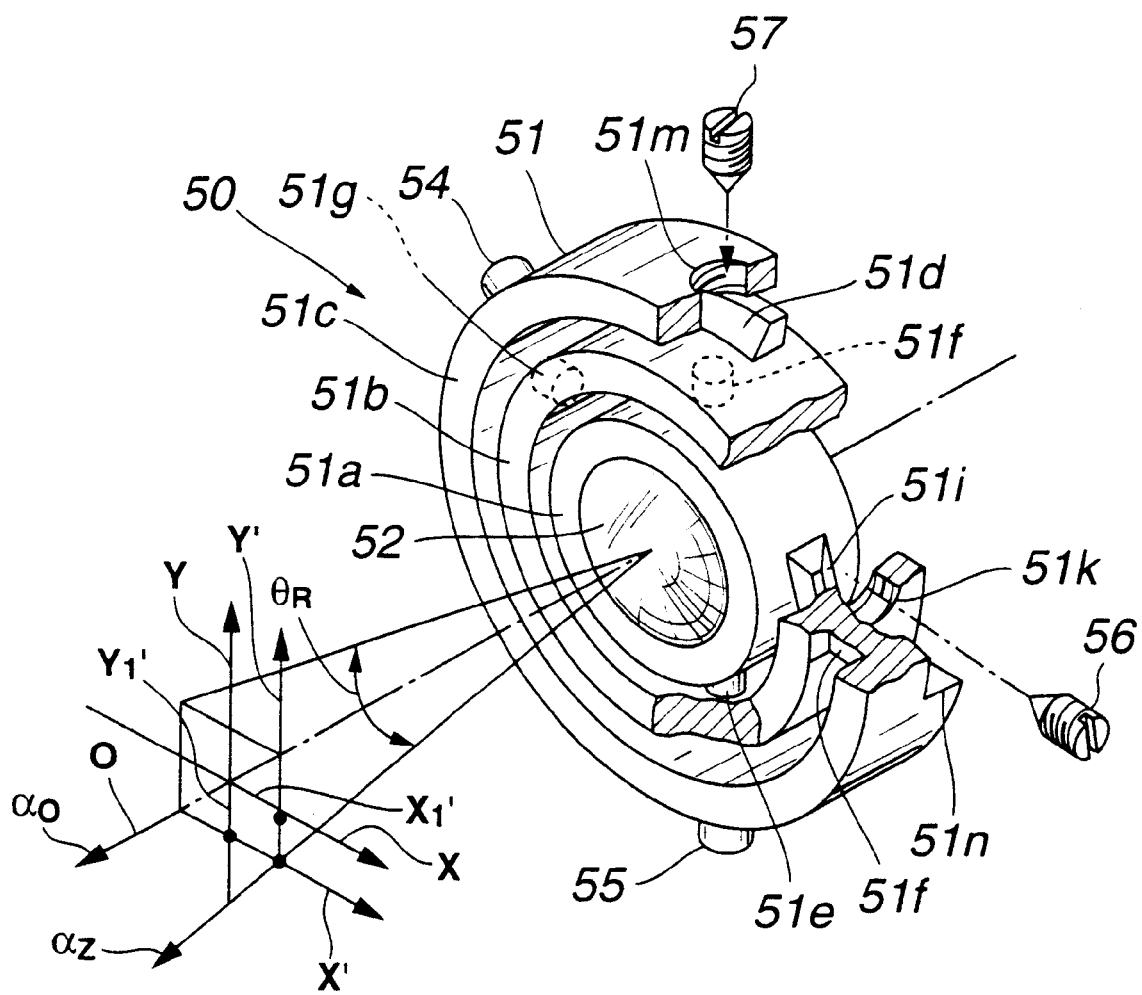
FIG. 20 is an exploded perspective view of the lens frame of the sixth embodiment.

FIG. 18 is a plan view of the lens frame that is the sixth embodiment. Further, FIG. 19 is a sectional view taken on line VI-O-VI of FIG. 18. FIG. 20 is an exploded perspective view of this lens frame.

A lens frame 50 of this embodiment is a lens barrel, or a lens frame adapted so that the posture of an optical system incorporated into optical equipment is adjustable. Further, the lens frame 50 consists mainly of a lens frame body 51, a lens 52, which serves as an optical member (namely, an optical device) held in the lens frame body, and cam followers 53, 54, and 55 securely fixed on the outer periphery of the lens frame 51.

Similarly as in the case of the fifth embodiment, this lens frame 50 is adapted so that the fine adjustment of the optical system posture of the lens 52, namely, the inclination of the optical axis O of the lens 52 with respect to the lens frame body 51 can be performed.

Incidentally, similarly as in the case of the fifth embodiment, it is supposed in this embodiment that "X-axis" and "Y-axis" respectively denote axes, which are perpendicular to the optical axis O of the lens 52 and orthogonal to each other and which pass through the center $P_0$ in the direction of the optical axis of the lens 52 and correspond to horizontal and vertical directions. Further, a point of intersection between X-axis and Y-axis is set to be a point of intersection among the axes of cylindrical portions 51d, 51e, 51f, and 51g, and denoted by "$P_0$". Moreover, it is assumed that the surface side of the lens frame 50 on FIG. 18 (which corresponds to the left-hand side thereof, as viewed in FIG. 19) is the "front side" thereof, and that the back side thereof on FIG. 18 (which corresponds to the right-hand side thereof, as viewed in FIG. 19) is the "rear side" thereof.

The lens frame body 51 is an integral member in which a connecting portion (to be described later) connects the following frames 51a, 51b, 51c, that is, a ring-like inner frame 51a serving as a holding member for holding the lens 52, a ring-like intermediate frame 51b serving as a first support frame disposed so that the frame 51b surrounds the outer periphery of the inner frame 51a and that a gap is formed between the frames 51a and 51b, and a ring like outer frame 51c disposed so that the frame 51c surrounds the outer periphery of the intermediate frame 51b and that a gap is formed between the frames 51b and 51c. Incidentally, the cam followers 53, 54, and 55 are securely fixed at positions at which the outer circumference of the outer frame 51c is trisected.

Similarly as in the case of the fifth embodiment, the inner frame 51a and the intermediate frame 51b are connected by cylindrical portions 51d and 51e, which are formed in such a way as to be integral with these frames 51b and 51c, and which are torsionally deformable first connecting portions extending upwardly and downwardly on Y-axis.

Further, the intermediate frame 51b and the outer frame 51c are connected by cylindrical portions 51f and 51g, which are formed in such a way as to be integral with these frames 51b and 51c, and which are torsionally deformable second connecting portions extending laterally on X-axis. Incidentally, the cylindrical portions 51d, 51e and 51f, 51g are disposed on Y-axis or along X-axis in such a manner as to be symmetric with the optical axis center.

Further, in the intermediate frame 51b, a female screw portion 51k is provided on the right-hand part of the outer periphery, as viewed in FIG. 18, and arranged along X-axis. Furthermore, in the outer frame 51c, a female screw portion 51m is provided on the upper-side outer periphery of the frame, as viewed in this figure, and arranged along Y-axis. Incidentally, a notch portion 51n, through which an adjustment screw passes, is provided in a portion opposed to the female screw portion 51k of the outer frame 51c.

An adjustment screw 56 serving as a first adjusting member is screwed into the female screw portion 51k of the intermediate frame 51b through the opening 51h. Further, an adjustment screw 57 serving as a second adjusting member is screwed into the female screw portion 51m of the outer frame 51c. Incidentally, the adjustment screws 56 and 57 are slotted machine screws.

Furthermore, the inner frame 51a is provided with a projection portion 51i, which serves as a pressed portion projecting in the direction of X-axis to a place opposed to the female screw portion 51k of the intermediate frame 51b and has a rear-side inclined surface in the outward and forward direction of X-axis, in a right-hand side part of the outer peripheral portion thereof. Further, similarly, the intermediate frame 51b is provided with a projection portion 51j, which serves as a pressed portion projecting in the direction of X-axis to a place opposed to the female screw portion 51m of the outer frame 51c and upwardly from the outer peripheral portion thereof, and which has a front-side inclined surface inclined in the outward and rearward direction of Y-axis.

The inclined surface of the inclined projection portions 51i and 51j can be pressed by the tip ends of the adjustment screws 56 and 57 screwed from the directions of X-axis and Y-axis. When the projection portions 51i and 51j are pressed, the intermediate frame 51b and the outer frame 51c are rotated around Y-axis and X-axis by minute angles, respectively, through the inclined surfaces thereof. Thus, the optical axis direction α of the lens 52 changes.

Incidentally, an initial direction $\alpha_z$ of the optical axis of the lens 52 (namely, the inclination thereof in an initial state) is set so that the direction of the point of intersection of X'-axis and Y'-axis is deviated from the direction $\alpha_0$ (namely, the degree of inclination is 0°) of an optical axis O, which is an adjustment target position, as viewed in FIG. 20, and that X'-intercept is $X_1'$, which is positive, and Y'-intercept is $Y_1'$, which is negative, on X'Y'-plane.

Further, in this figure, an angle $\theta_R$ formed between two lateral edges of a quadrangular prism having a lateral edge extending in the initial direction $\alpha_z$ of the optical axis indicates an adjustment range. When the adjustment is performed within this adjustment range $\theta_R$, a state, in which the end faces of the screwed adjustment screws 56 and 57 are abutted against the plate-like projection portions 51i and 51j, is maintained. Moreover, the cylindrical portions 51d, 51e, 51f, and 5g deform within a natural range. Consequently, high-accuracy adjustment can be attained.

Next, an optical system inclination adjusting operation of the lens frame 50 of the sixth embodiment constructed as described above will be described hereinbelow.

Although the adjusting operation of the lens frame 50 of this embodiment is nearly the same as of the lens frame of the fifth embodiment, the former adjusting operation differs from the latter adjusting operation in the direction in which the adjustment screws 56 and 57 are inserted and screwed into the lens frame. That is, when the lens frame 50 is adjusted singly, the adjustment screws 56 and 57 are screwed thereinto from the directions of X-axis and Y-axis, respectively. Further, the optical axis is swung by controlling the screwing depth of each of the adjustment screws 56 and 57. Thus, the initial lens optical axis direction (or inclination) $\alpha_z$ is adjusted to the adjustment target direction $\alpha_0$ (namely, the degree of the optical axis angle is 0) of the optical axis O. During the adjustment, the center $P_0$ does not move for the same reason as described in the description of the fifth embodiment.

Figure 21:
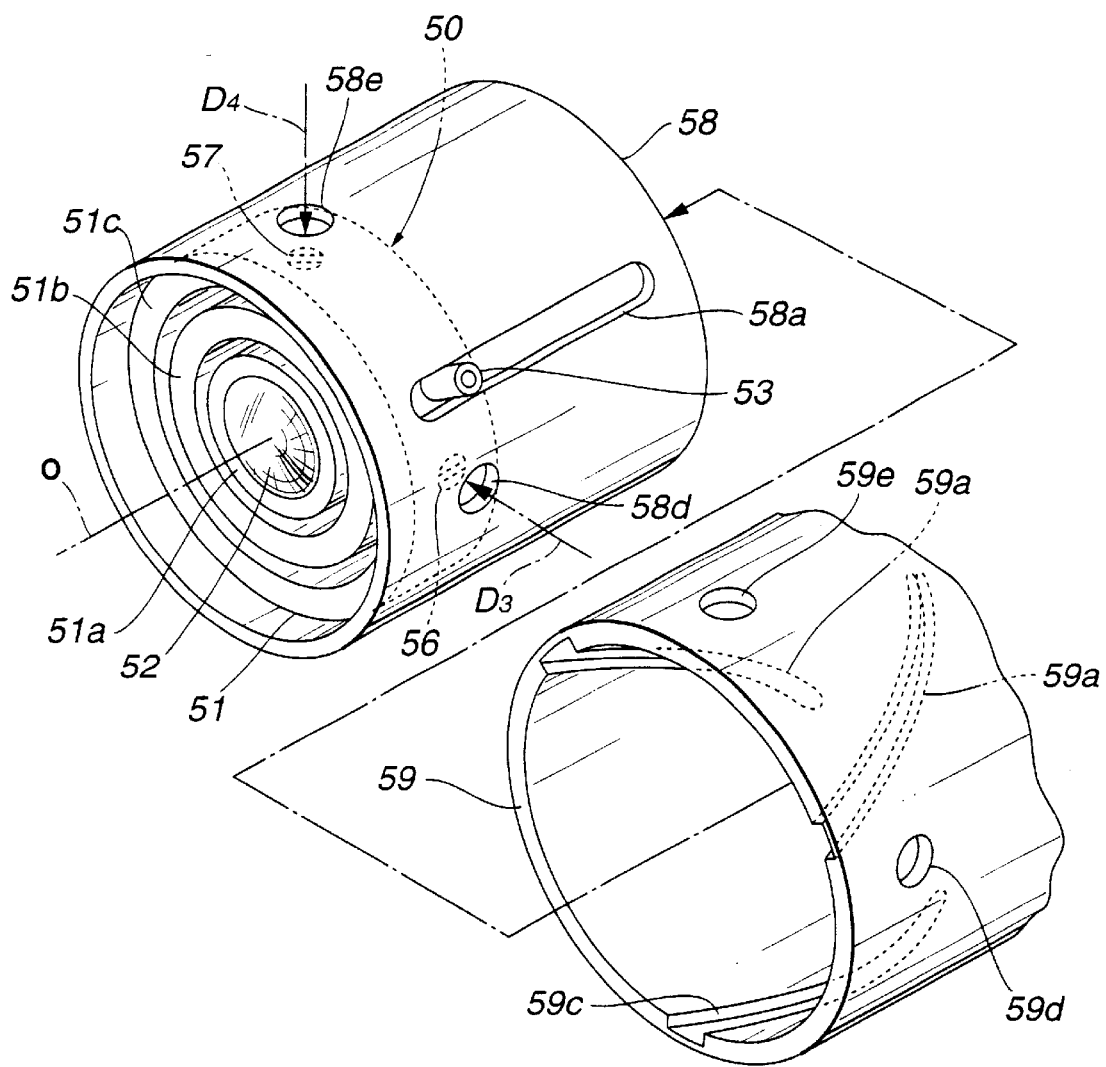
FIG. 21 is an exploded perspective view of the lens frame of the sixth embodiment in which a cam ring is incorporated.

FIG. 21 illustrates a state in which the lens frame 50 is incorporated into a rectilinear cam ring 58, and further into a rotational cam ring 59. When the adjustment of the lens frame 50 is performed in this incorporated state, the adjustment screws 56 and 57 are screwed from the directions $D_3$ or $D_4$ along X-axis or Y-axis through adjustment openings 59d, 58d, and 59e, 58e of the cam rings 58 and 59. Then, the screwing depth of each of the screws 56 and 57 is controlled. Thereafter, an operation similar to that in the case of adjusting the lens frame singly is performed.

The lens frame 50 of the sixth embodiment obtains advantageous effects similar to those of the lens frame 40 of the fifth embodiment. Moreover, the lens frame 50 can perform the adjustment of the inclination of the optical axis O of the lens from a direction orthogonal to the optical axis O, and thus has another advantageous effect in that the adjustment is more easily performed in a state in which the lens frame is incorporated into the cam ring.

As described above, each of the lens frames of the fifth and sixth embodiments has a simple structure. Moreover, the adjustment of the optical system posture can be performed by swinging the optical axis of each of the optical members, such as the lens and the prism. In the case of these lens frames, even when the optical axis is swung, there is extremely small change in position of the optical axis center. Consequently, the posture can be adjusted with good accuracy.

Next, a lens frame, which is a lens barrel of a seventh embodiment of the present invention, will be described hereinbelow.

Figure 22:
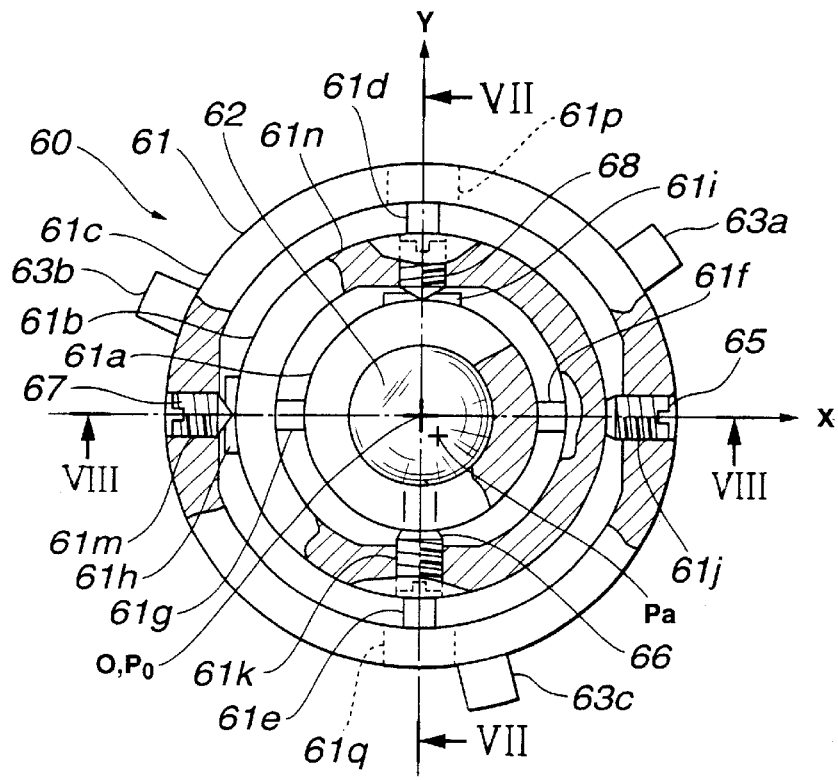
FIG. 22 is a plan view illustrating a lens frame that is a seventh embodiment of the lens barrel of the present invention.
Figure 23A:
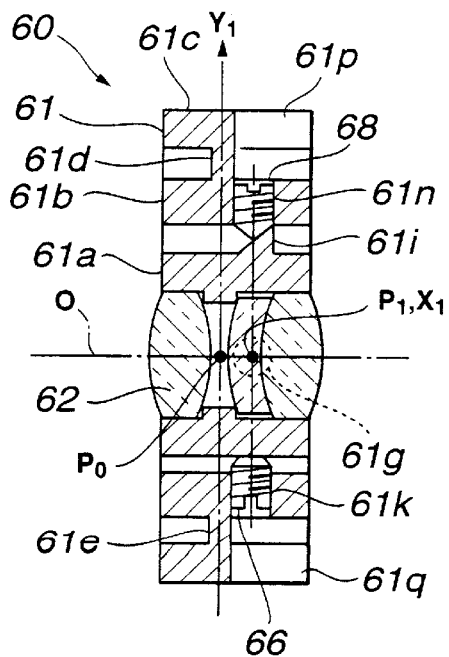
FIG. 23(A) is a sectional view taken on line VII-O-VII of FIG. 22.
Figure 23B:
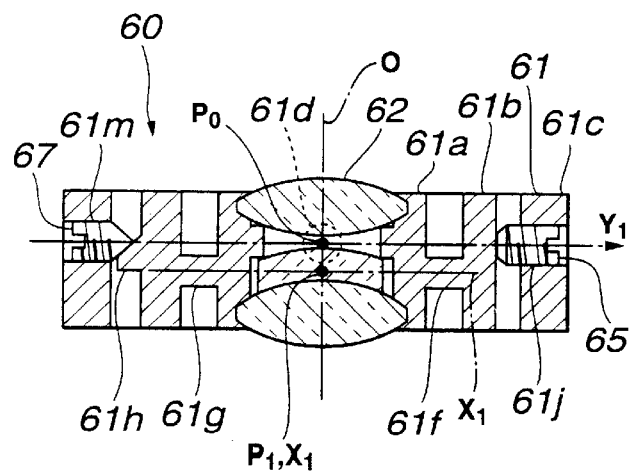
FIG. 23(B) is a sectional view taken on line VIII-O-VIII of FIG. 22.
Figure 24:
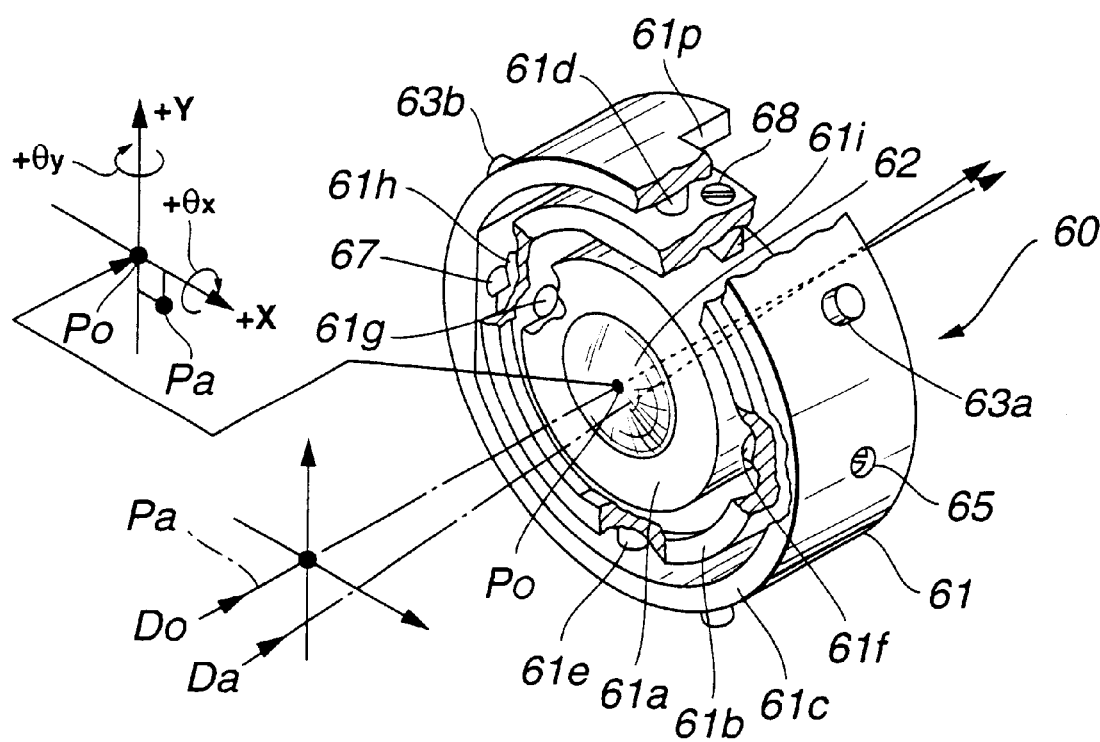
FIG. 24 is a perspective view of a lens frame of the seventh embodiment.

FIG. 22 is a plan view of the lens frame that is this embodiment. Further, FIGS. 23(A) and 23(B) are a sectional view taken on line V-O-V of FIG. 22 and a sectional view taken on line VIII-O-VIII. FIG. 24 is a perspective view of this lens frame.

A lens frame 60 of this embodiment is a lens barrel, or a lens frame adapted so that the position and posture of an optical system incorporated into optical equipment is adjustable. Further, the lens frame 60 consists mainly of a lens frame body 61, a lens 62, which serves as an optical member (namely, an optical device) held in the lens frame body 61, cam followers 63a, 63b, and 63c securely fixed on the periphery of the lens frame 61, and adjustment screws 65, 66, 67, and 68, which serve as adjusting members for adjustment of the position and posture of the optical system.

This lens frame 60 is adapted so that the adjustment for correcting variation in the optical axis when the lens 62 is mounted in the lens frame body 61, namely, the position and posture of the optical system of the lens 62, that is, both of the adjustment of the optical axis position in a direction orthogonal to the lens optical axis O and the adjustment of the direction (or inclination) of the optical axis O of the lens 62 can be performed. Incidentally, in the case of this embodiment, an adjustment reference for adjustment of the optical axis posture is, for example, the outside-diameter portion of the lens frame body 61, and is selected according to a condition in which the lens frame is mounted in the optical equipment.

Incidentally, let "X-axis" and "Y-axis" respectively denote axes, which are perpendicular to the optical axis O of the lens 62 and orthogonal to each other and which correspond to horizontal and vertical directions. Further, a point of intersection between X-axis and Y-axis is denoted by "$P_0$", which is nearly equivalent to a point of intersection among the axes of cylindrical portions 61d, 61e, 61f, and 61g. However, strictly speaking, the axis center of each of the cylindrical portions 61g and 61f slightly differs from those in the direction of the optical axis of the cylindrical portions 61d and 61e, owing to the structural necessity. Furthermore, it is supposed that the surface side of the lens frame 60 of FIG. 22, which corresponds to this side of paper on which FIG. 22 is drawn, is the "front side" thereof, and that the back side thereof on FIG. 22, which corresponds to the back side of the paper, is the "rear side" thereof.

The lens frame body 61 is an integral member in which a connecting portion (to be described later) connects the following frame portions 61a, 61b, 61c, that is, a ring-like inner frame 61a serving as a holding member (namely, a first frame portion) for holding the lens 62, a ring-like intermediate frame 61b serving as a first support frame (namely, a second frame portion) disposed so that the frame 61b surrounds the outer periphery of the inner frame 61a and that a gap is formed between the frames 61a and 61b, and a ring like outer frame 61c (namely, a third frame portion) serving as a second support frame disposed so that the frame 61c surrounds the outer periphery of the intermediate frame 61b and that a gap is formed between the frames 61b and 61c. Incidentally, the cam followers 63a, 63b, and 63c are securely fixed at positions at which the outer circumference of the outer frame 61c is trisected.

The inner frame 61a and the intermediate frame 61b are connected by cylindrical portions 61f and 61g, which are formed in such a way as to be integral with these frames 61a and 61b, and which are elastically deformable first connecting portions (namely, a translation mechanism and an inclination adjusting mechanism) extending across the optical axis and extending laterally on $X_1$-axis (as viewed in FIG. 23(B)) that is extremely close and parallel to X-axis. Incidentally, a point of intersection between $X_1$-axis and the optical axis O is denoted by "$P_1$".

Further, the intermediate frame 61b and the outer frame 61c are connected by cylindrical portions 61d and 61e, which are formed in such a way as to be integral with these frames 61b and 61c, and which are torsionally deformable second connecting portions (namely, a translation mechanism and an inclination adjusting mechanism) extending upwardly and downwardly on Y-axis.

Further, in the intermediate frame 61b, female screw portions 61n and 61k are provided in such a manner as to be opposed to each other and as to extend along $Y_1$-axis (see FIG. 23(A)) that is orthogonal to the $X_1$-axis, which is the axis center of each of the cylindrical portions 61f and 61g, and that passes through the point of intersection $P_1$.

Incidentally, to avoid the interference between the female screw portions 61n and 61k and the cylinder portions 61d and 61e, $Y_1$-axis, which is the axis center of each of the female screw portions 61n and 61k, and $X_1$-axis, which is orthogonal thereto, are slightly deviated in the direction of the optical axis O from Y-axis and X-axis, respectively, as described above.

In the outer frame 61c, female screw portions 61m and 61j are provided in such a manner as to extend along and as to be opposed to X-axis. Moreover, notch portions 61q and 61p, through which adjustment screws pass, are provided at places to be opposed to the female screw portions 61k and 61n of the intermediate frame 61b.

First adjustment screws 66 and 68 serving as first adjusting members are screwed into the female screw portions 61k and 61n of the intermediate frame 61b, respectively. Further, adjustment screws 65 and 67 serving as second adjusting members are screwed into the female screw portions 61j and 61m of the outer frame 61c. Incidentally, the adjustment screws 65 and 66 are flat-point-like slotted machine screws, and the adjustment screws 67 and 68 are slotted machine screws each having a conical end.

Furthermore, the inner frame 61a is provided with an inclined projection portion 61i, which serves as an inclination adjusting mechanism projecting to a place opposed to the female screw portion 61n of an upper part of the outer peripheral portion of the inner frame 61a and inclining outwardly, radially and backwardly on $Y_1$-axis, in a right-hand side part of the outer peripheral portion thereof. Further, similarly, the intermediate frame 61b is provided with an inclined projection portion 61j, which serves as an inclined portion outwardly that projects to a place opposed to the female screw portion 61m of the outer frame 61c and upwardly from the outer peripheral portion thereof, and that extends on the X-axis and inclines backwardly and outwardly.

Additionally, the initial lens optical axis position Pa is set (see FIG. 22) in such a way as to be slightly rightwardly and downwardly eccentric from the position Po of an optical axis O, which is an adjustment target position. Further, an initial lens optical axis direction Da (namely, the inclination of the optical axis) rightwardly and downwardly inclines to the optical axis direction $D_0$ (that is, the angle of inclination of the optical axis is 0), which is a target direction of adjustment, at the light incidence side (see a perspective view of FIG. 24). The reason for setting such predetermined initial eccentricity and inclination at predetermined values is to perform adjustment by maintaining a state in which the adjustment screws 65, 66, 67 and 68 are screwed thereinto and which end faces of these screws are abutted against the frame outside-diameter surface and the inclined projection portion 61h and 61i.

Next, optical system position and posture adjusting operations of the lens frame 60 of the seventh embodiment constructed as described above will be described hereinbelow.

Such adjustment operations are performed by using an adjustment jig consisting of, for example, a point light source portion and an optical-axis detecting CCD portion. Further, the point light source portion is set at a light incidence side, while the CCD portion is set at a light output side. Then, the adjustment is performed by detecting the inclination and position of the optical axis at the light output side according to optical axis detection signals outputted from the CCD portion.

In the case that the adjustment is performed by the lens frame 60 singly, the adjustment screws 65, 66, 67, and 68 are screwed in the female screw portions. Then, the screwing depth of each of these screws is controlled. Subsequently, the inclination of the optical axis is adjusted according to the detection outputs of the CCD portions. Then, the position of the optical axis is adjusted.

First, the adjustment screw 68 is screwed in the female screw portion 61n of the intermediate frame 61b. Then, the inclined surface of the inclined projection portion 61i of the inner frame 61a is pushed by the tip end of the adjustment screw, the cylindrical portions 61f and 61g elastically deform owing to distortion. Further, the inner frame 61a is inclined clockwise (as viewed from the right-hand direction in FIG. 24) to a direction (+θ$_x$).

Moreover, the adjustment screw 67 is screwed in the female screw portion 61m of the intermediate frame 61c. Then, the inclined surface of the inclined projection portion 61h of the inner frame 61b is pushed by the tip end of the adjustment screw, the cylindrical portions 61d and 61e elastically deform owing to distortion. Furthermore, the inner frame 61b is inclined clockwise (as viewed from above in FIG. 24) to a direction (+θ$_y$). Thus, the direction or inclination of the optical axis is adjusted to the target direction D$_0$ of the optical axis by inclining the frame portion in both the directions.

Subsequently, the adjustment screw 66 is screwed in the female screw portion 61k of the intermediate frame 61b. Thereafter, when a part placed on Y$_1$-axis in a lower portion of the inner frame 61a is pressed, the cylindrical portions 61f and 61g cause shearing or bending elastic distortion, so that the inner frame 61a and the lens 62 perform translation (parallel displacement) upwardly along Y$_1$-axis without being inclined.

Then, the adjustment screw 65 is screwed in the female spring portion 61j of the outer frame 61c. Thereafter, when an upper right part of the outer peripheral portion of the intermediate frame 61b, which is placed on X-axis, is pushed, the cylindrical portions 61d and 61e cause shearing or bending elastic distortion, so that the intermediate frame 61b and the lens 62 perform translation leftwardly in the direction of X-axis without being inclined. The aforementioned translations performed in both of the two directions enables the displacement of the optical axis position from the initial lens optical axis position Pa to the target position P$_0$ of the optical axis O.

Thereafter, the adjustment screws are fixed by adhesives. Thus, the adjustment of the position and posture of the optical system is finished.

Next, a description is given about an operation of adjusting the position and posture of the optical system of the lens frame 60 of the seventh embodiment put in a state in which the lens frame 60 is incorporated into the cam ring.

Figure 25:
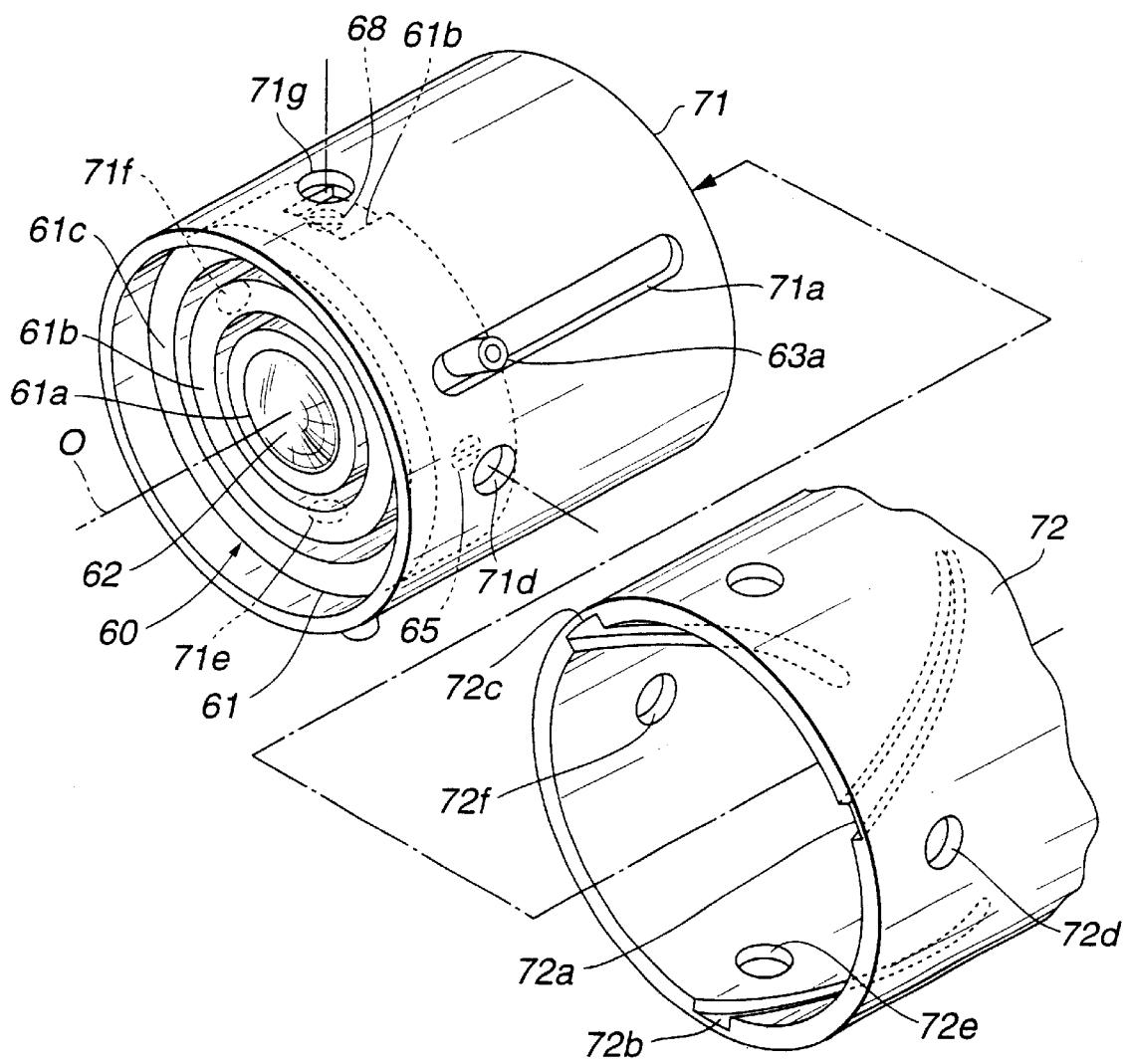
FIG. 25 is an exploded perspective view of the lens frame of the seventh embodiment in which a cam ring is incorporated.

FIG. 25 is an exploded perspective view of a lens barrel in which the lens frame 60 is incorporated into a rectilinear cam ring 71 that can be incorporated into a rotational cam ring 72.

The lens frame 60 is incorporated into the rectilinear cam ring 71 and the rotational cam ring 72 in a state in which the cam followers 63a, 63b, and 63c are slidably fitted into rectilinear grooves 71a (formed at three places) and cam grooves 72a, 72b, and 72c of the rotational cam ring 72. The adjustment screws 65, 66, 67, and 68, are screwed through adjustment openings 71d, 71e, 71f, and 71g formed correspondingly to four directions from the rectilinear cam ring 71 and adjustment openings 72d, 72e, 72f, and 72g formed correspondingly to four directions from the rotational cam ring. In the case that the adjustment of the lens frame 60 is performed in a state in which the lens frame 60 is incorporated into the cam rings as described above, the screwing depth of these adjustment screws is controlled. Thus, the inclination and position of the optical axis are adjusted to the target values of the inclination and position thereof.

In the case of the lens frame 60 of the seventh embodiment, the lens frame body 61 has a simple integral structure. Further, the adjustment of both of the position and inclination of the optical axis orthogonal to the optical axis O of the lens 62 is achieved. Moreover, the position of the optical axis and the inclination thereof may be performed nearly independently and individually. Consequently, an adjusting operation is easily performed.

Incidentally, in the case of the lens frame 60 of this embodiment, the deformation caused in the cylindrical portions 61d, 61e or 61f, 61g is essentially elastic deformation, such as distortion utilizing shearing distortion, unidirectional shearing, and bending. However, if readjustment of the lens frame is not performed, adjustment utilizing plastic deformation may be performed. Furthermore, although the adjustment of the position of the optical axis is performed after the adjustment of the inclination of the optical axis in this embodiment, the order of performing the adjustment of the position and inclination of the optical axis is not limited thereto.

Next, a lens frame, which is a lens barrel of an eighth embodiment of the present invention, will be described hereinbelow.

Figure 26:
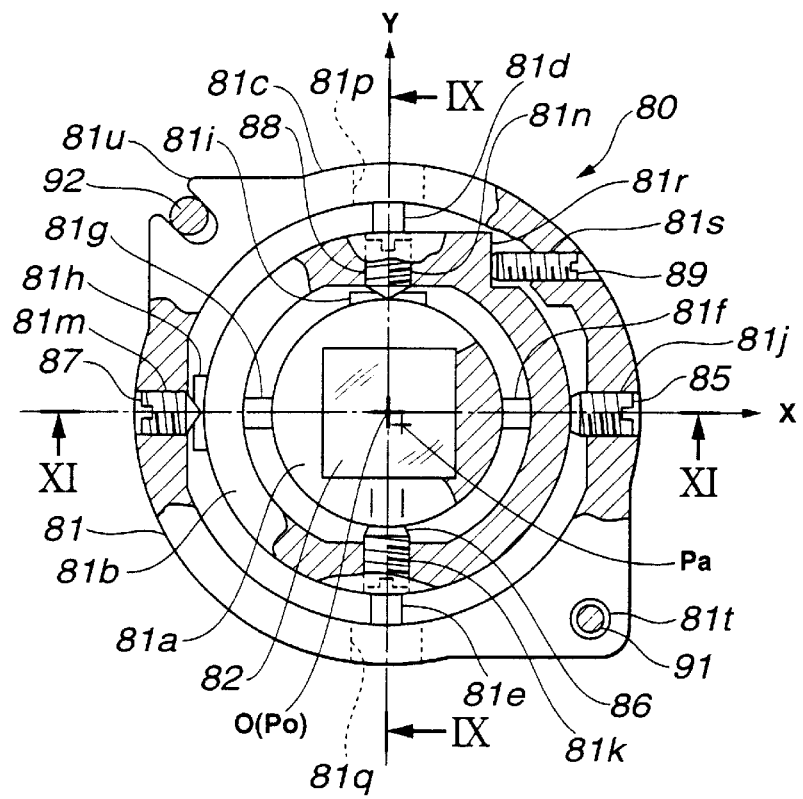
FIG. 26 is a plan view illustrating a lens frame that is an eighth embodiment of the lens barrel of the present invention.
Figure 27:
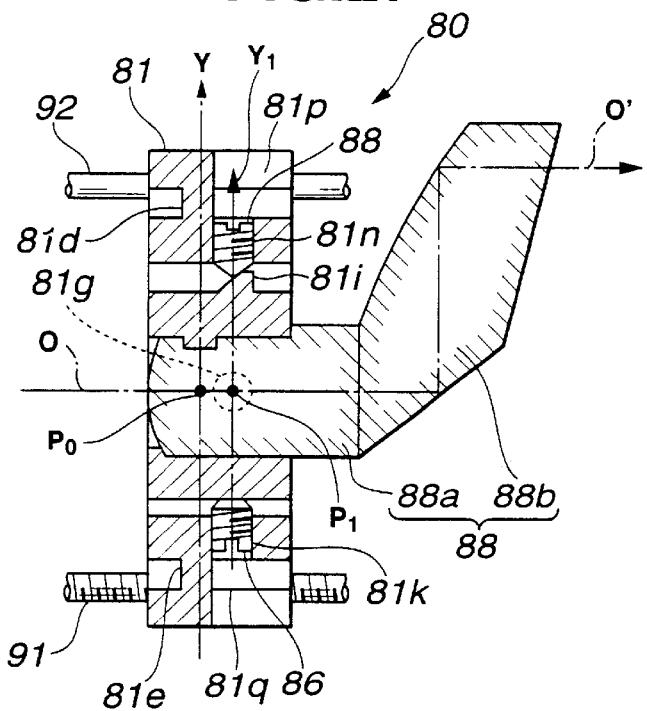
FIG. 27 is a sectional view taken on line IX—IX of FIG. 26.
Figure 28:
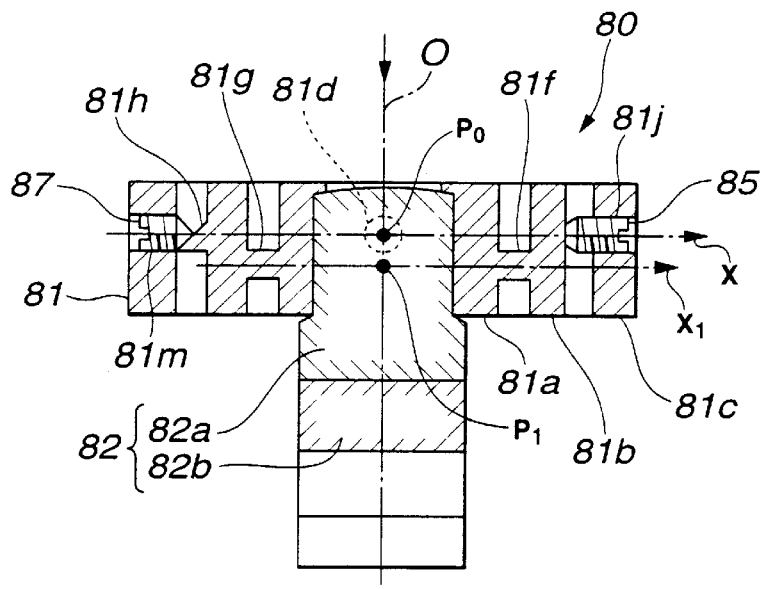
FIG. 28 is a sectional view taken on line XI—XI of FIG. 26.
Figure 29:
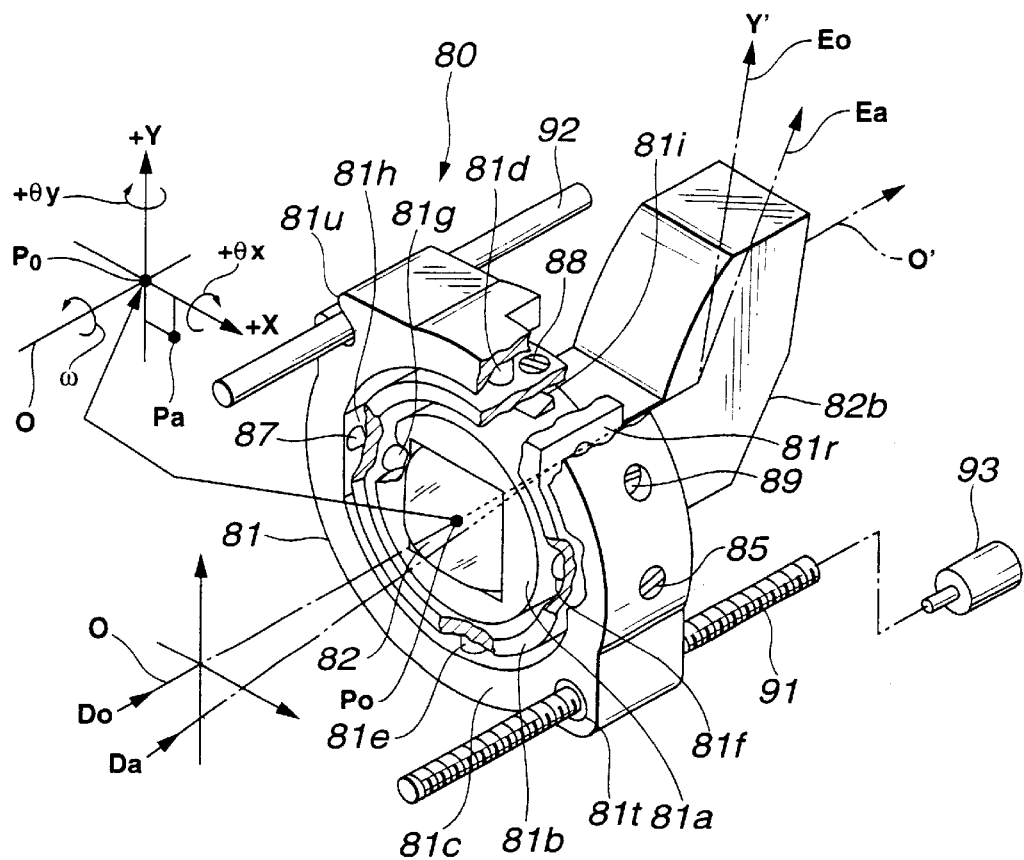
FIG. 29 is a perspective view of the lens frame of the eighth embodiment in a state into which an optical device is inserted.

FIG. 26 is a plan view of the lens frame that is the eighth embodiment. Further, FIGS. 27 is a sectional view taken on line IX—IX of FIG. 26. FIGS. 28 is a sectional view taken on line XI—XI of FIG. 26. FIG. 29 is a perspective view of this lens frame mounted in an optical device.

A lens frame 80 of this embodiment has an optical device and is a lens barrel, or a lens frame adapted so that the position and posture of an optical system incorporated into optical equipment is adjustable. Further, the lens frame 80 consists mainly of a lens frame body 81, a lens 82, which serves as an optical member (namely, an optical device) held in the lens frame body 81, adjustment screws 85, 86, 87, 88, and 89, which serve as adjusting members for adjustment of the position of the optical system, a feed screw 91 for driving the lens frame body 81 in such a manner as to proceed and retreat along the optical axis, and a guide shaft 92 for guiding the guide shaft 92 along the optical axis.

This lens frame 80 is adapted so that the adjustment for correcting variation in the optical axis when the lens 82 is mounted in the lens frame body 81, namely, the position and posture of the optical system of the lens 82, that is, both of the adjustment (namely, the translation of the optical axis) of the optical axis position in a direction orthogonal to the lens optical axis O and the adjustment of the direction (or posture) of the optical axis O of the lens 82 can be performed. Incidentally, in the case of this embodiment, adjustment references for the adjustment are the feed screw 91 ad the guide shaft 92 for supporting the lens frame.

Incidentally, let "x-axis" and "Y-axis" respectively denote axes, which are perpendicular to the optical axis O of the lens 92 and orthogonal to each other and which correspond to horizontal and vertical directions, respectively. Further, a point of intersection between X-axis and Y-axis is denoted by "P$_0$", which is nearly equivalent to a point of intersection among the axes of cylindrical portions 81d, 81e, 81f, and 81g. However, strictly speaking, the axis center of each of the cylindrical portions 81g and 81f slightly differs from those in the direction of the optical axis of the cylindrical portions 81d and 81e, owing to the structural necessity.

Furthermore, it is supposed that the surface side of the lens frame 80 of FIG. 22, which corresponds to this side of paper on which FIG. 26 is drawn, is the "front side" thereof, and that the back side thereof on FIG. 26, which corresponds to the back side of the paper, is the "rear side" thereof.

The lens 82 is an L-shaped complex curved lens, and constituted by an incidence-side lens block 82a and an output-side lens block 82b. Let "O" denote an incidence-side optical axis of the incidence-side lens block 82a.

Further, let "O'" designate an output-side optical axis of the output-side lens block 82*b*. The optical axis O' is parallel with and spaced apart from the optical axis O by a predetermined distance.

The lens frame body 81 is an integral member in which a connecting portion (to be described later) connects the following frame portions 81*a*, 81*b*, 81*c*, that is, a ring-like inner frame 81*a* serving as a holding member (namely, a first frame portion) for holding the lens 82, a ring-like intermediate frame 81*b* serving as a first support frame (namely, a second frame portion) disposed so that the frame 81*b* surrounds the outer periphery of the inner frame 81*a* and that a gap is formed between the frames 81*a* and 81*b*, and a ring like outer frame 81*c* (namely, a third frame portion) serving as a second support frame disposed so that the frame 81*c* surrounds the outer periphery of the intermediate frame 81*b* and that a gap is formed between the frames 81*b* and 81*c*.

The inner frame 81*a* and the intermediate frame 81*b* are connected by cylindrical portions 81*f* and 81*g*, which are formed in such a way as to be integral with these frames 81*a* and 81*b*, and which are elastically deformable first connecting portions (namely, a translation (parallel displacement) mechanism and an inclination adjusting mechanism) extending across the optical axis and extending laterally on $X_1$-axis (as viewed in FIG. 28) that is close and parallel to X-axis. Incidentally, a point of intersection between $X_1$-axis and the optical axis O is denoted by "$P_1$".

Further, the intermediate frame 81*b* and the outer frame 81*c* are connected by cylindrical portions 81*d* and 81*e*, which are formed in such a way as to be integral with these frames 81*b* and 81*c*, and which are elastically deformable second connecting portions (namely, a translation (parallel displacement) mechanism and an inclination adjusting mechanism) extending upwardly and downwardly on Y-axis.

Further, in the intermediate frame 81*b*, female screw portions 81*n* and 81*k* are provided in such a manner as to be opposed to each other and as to extend along $Y_1$-axis (see FIG. 27) that is orthogonal to the $X_1$-axis, which is the axis center of each of the cylindrical portions 81*f* and 81*g*, and that passes through the point of intersection $P_1$. Further, an adjustment screw abutting portion 81*r* is provided on an upper right side surface of the female screw portion 81*n* of the intermediate portion 81*r*.

Incidentally, to avoid the interference between the female screw portions 81*n* and 81*k* and the cylinder portions 81*d* and 81*e*, $Y_1$-axis, which is the axis center of each of the female screw portions 81*n* and 81*k*, and $X_1$-axis, which is orthogonal thereto, are slightly deviated in the direction of the optical axis O from Y-axis and X-axis, respectively, as described above.

In the outer frame 81*c*, female screw portions 81*m* and 81*j* are provided in such a manner as to extend along and as to be opposed to X-axis. Moreover, notch portions 81*q* and 81*p*, through which adjustment screws pass, are provided at places to be opposed to the female screw portions 81*k* and 81*n* of the intermediate frame 81*b*. Furthermore, in the outer frame 81*c*, a female screw portion 81*s* is provided in an upper right portion thereof to the horizontal direction parallel to X-axis. Further, a female portion 81*t*, in which a feed screw 91 is screwed, is provided at a lower right part of the outer frame 81*c*. Moreover, a notch portion 81*u*, into which the guide shaft 92 is fitted, is provided at a left upper part of the outer frame 81*c*.

First adjustment screws 86 and 88 serving as first adjusting members are screwed into the female screw portions 81*k* and 81*n* of the intermediate frame 81*b*, respectively. Further, adjustment screws 85 and 87 serving as second adjusting members are screwed into the female screw portions 81*j* and 81*m* of the outer frame 81*c*. Likewise, an adjustment screw 89 serving as a third adjusting member is screwed into the female screw portion 81*s* of the outer frame 81*c*. Incidentally, the adjustment screws 85, 86, and 89 are flat-point-like slotted machine screws, and the adjustment screws 87 and 88 are slotted machine screws each having a conical end.

Furthermore, the inner frame 81*a* is provided with an inclined projection portion 81*i*, which serves as an inclination adjusting mechanism projecting to a place opposed to the female screw portion 81*n* of an upper part of the outer peripheral portion of the inner frame 81*a* and inclining outwardly, radially and backwardly on $Y_1$-axis (see FIG. 27). Further, similarly, the intermediate frame 81*b* is provided with an inclined projection portion 81*h* (see FIG. 28), which serves as an inclined portion outwardly that projects to a place opposed to the female screw portion 81*m* of the outer frame 81*c* and upwardly from the outer peripheral portion thereof, and that extends on the X-axis and inclines backwardly and outwardly.

In a state in which the position and posture of the optical system are unadjusted just upon completion of assembling the lens frame 80 of this eighth embodiment, the initial lens optical axis position Pa is set (see FIGS. 26 and 29) in such a way as to be parallel to the optical axis O and as to be slightly rightwardly and downwardly eccentric from the position Po of the optical axis O, which is an adjustment target position. Further, an initial lens optical axis direction Da (namely, the inclination of the optical axis) rightwardly and downwardly inclines to the optical axis direction $D_0$ (that is, the angle of inclination of the optical axis is 0), which is a target direction of adjustment, at the light incidence side (see a perspective view of FIG. 29). Furthermore, the direction of the initial lens inclination Ea (corresponding to the lateral deviation of the optical axis O') around the optical axis O of the lens is slightly clockwise turned from an adjustment target direction $E_0$ (which coincides with the direction of Y'-axis) around the optical axis O.

The reason for setting each of such predetermined initial eccentricity and inclination at a predetermined value corresponding to a predetermined direction is to perform adjustment by maintaining a state in which the adjustment screws 85, 86, 87 and 88, 89 are screwed thereinto and which end faces of these screws are abutted against the frame outside-diameter surface and the inclined projection portion 81*h* and 81*i* and a screw abutting surface 81*r*.

Next, optical system position and posture adjusting operations of the lens frame 80 of the eight embodiment constructed as described above will be described hereinbelow.

Such adjustment operations are performed by using an adjustment jig consisting of, for example, a point light source portion and an optical-axis detecting CCD portion, similarly as in the case of the seventh embodiment. The CCD portion is set on a light-output-side optical axis O' of FIGS. 27 and 28. The adjustment is performed by taking the relative positional relation between the optical axis O and the CCD portion into consideration.

In the lens frame 80 of this embodiment, the adjustment of the position and posture of the optical system is performed by supporting the lens frame body 81 by the feed screw 91 and the guide shaft 92. First, the adjustment screws 85, 86, 87, 88, and 89 are screwed in the female screw portions. Then, the screwing depth of each of these adjustment screws is controlled. Thus, the adjustment of the inclination of the lens 82 around the optical axis O is first performed. Subsequently, the adjustment (translation) of the position of the optical axis of the lens 82 is performed.

Particularly, first, the adjustment screw 89 is screwed in the female screw portion 81n of the intermediate frame 81b. Subsequently, shearing or bending elastic deformation is caused in the cylindrical portions 81d and 81e by pressing the adjustment screw abutting portion 81r of the intermediate frame 81b. Then, the intermediate 81b is inclined or turned around the optical axis O. Further, the adjustment is performed so that the inclination of the lens 82, which is held in the inner frame 81a, around the optical axis O is adjusted to the target inclination direction $E_0$.

Next, when the adjustment screw 88 is screwed in the female screw portion 81n of the intermediate frame 81b, the inclined surface of the inclination projecting portion 81i of the inner frame 81a is pushed by the tip end of the adjustment screw. Then, the cylindrical portions 81f and 81g elastically deform owing to distortion. Further, the inner frame 81a is turned clockwise (as viewed from the right in FIG. 29) to a direction $(+\theta_x)$.

Moreover, when the adjustment screw 87 is screwed in the female screw portion 81m of the outer frame 81c, the inclined surface of the inclination projecting portion 81h of the intermediate frame 81b is pushed by the tip end of the adjustment screw. Then, the cylindrical portions 81d and 81e elastically deform owing to distortion. Further, the inner frame 81b is turned clockwise (as viewed from above in FIG. 29) to a direction $(+\theta_y)$. The inclination of the optical axis of the lens is adjusted to the target direction $D_0$ of the optical axis by inclining or turning the frame portion in both the directions.

Subsequently, the adjustment screw 86 is screwed in the female screw portion 81k of the intermediate frame 81b. Thereafter, when a part placed on $Y_1$-axis in a lower portion of the outer periphery of the inner frame 81a is pressed, the cylindrical portions 81f and 81g cause shearing or bending elastic distortion, so that the inner frame 81a and the lens 82 perform translation (parallel displacement) upwardly along $Y_1$-axis without being inclined.

Then, the adjustment screw 85 is screwed in the female spring portion 81j of the outer frame 81c. Thereafter, when an upper right part of the outer peripheral portion of the intermediate frame 81b, which is placed on X-axis, is pushed, the cylindrical portions $81_d$ and 81e cause shearing or bending elastic distortion, so that the intermediate frame 81b and the lens 82 perform translation (parallel displacement) leftwardly in the direction of X-axis without being inclined. The aforementioned translations performed in both of the two directions enables the displacement of the optical axis position from the initial lens optical axis position Pa to the target position $P_0$ of the optical axis O.

Further, the adjustment screw (namely, the rocking adjustment member) 89 is screwed in the female screw 81s of the outer frame 81c. Thus, rocking is performed owing to the shearing deformation of the cylindrical portion 81d and to the bending deformation of the cylindrical portion 81e by pressing the abutting portion 81r of the intermediate frame 81b. Thereafter, the adjustment screws are fixed by adhesives. Thus, the adjustment of the position and posture of the optical system is finished.

According to the lens frame 80 of the eighth embodiment, the lens frame body 81 has an integral simple structure, similarly as in the case of the lens frame 60 of the seventh embodiment. The adjustment of the position and incline of an optical axis in a direction orthogonal to the optical axis O of the lens 82 is easily achieved by screwing the adjust screws. In addition, similarly, the adjustment of the inclination around the optical axis O is achieved by screwing the adjustment screws.

Incidentally, the lens 62 or 82 is employed as the optical member held in the lens frame of each of the aforementioned embodiments. However, optical members, such as a prism and a mirror other than the lenses, may be employed as the optical member held in the lens frame of each of the aforementioned embodiments.

Further, when the optical member is not mounted in the lens frame body, the adjustment of the position and inclination of the axis of the lens frame may be performed by tentatively mounting a reference optical member. Furthermore, as described above, the adjustment of the inclination around the optical axis, the adjustment of the inclination of the optical axis and the adjustment of the position of the optical axis are performed in this order. However, the order of performing such adjustment operations is not necessarily limited to thereto.

Incidentally, in the foregoing description of the eighth embodiment, it has been described that the optical axis of the lens is adjusted to the center axis of the lens frame. However, if there is another relative position of the lens frame, the optical axis of the lens is not always adjusted to the lens frame center. In short, the position of the optical axis of the lens can be freely adjusted in a given direction.

As described above, according to the lens barrels of the seventh and eighth embodiments of the present invention, by which the position and posture adjustment of the optical system can be achieved, the adjustment of the position of the optical axis of the optical member (namely, the swinging of the optical axis), and the adjustment of the position of the optical axis in a plane orthogonal to the optical axis are easily attained. Moreover, there is provided a lens frame, whose structure is simple.

Next, a lens barrel, which is a ninth embodiment of the present invention, will be described hereinbelow.

Figure 30:
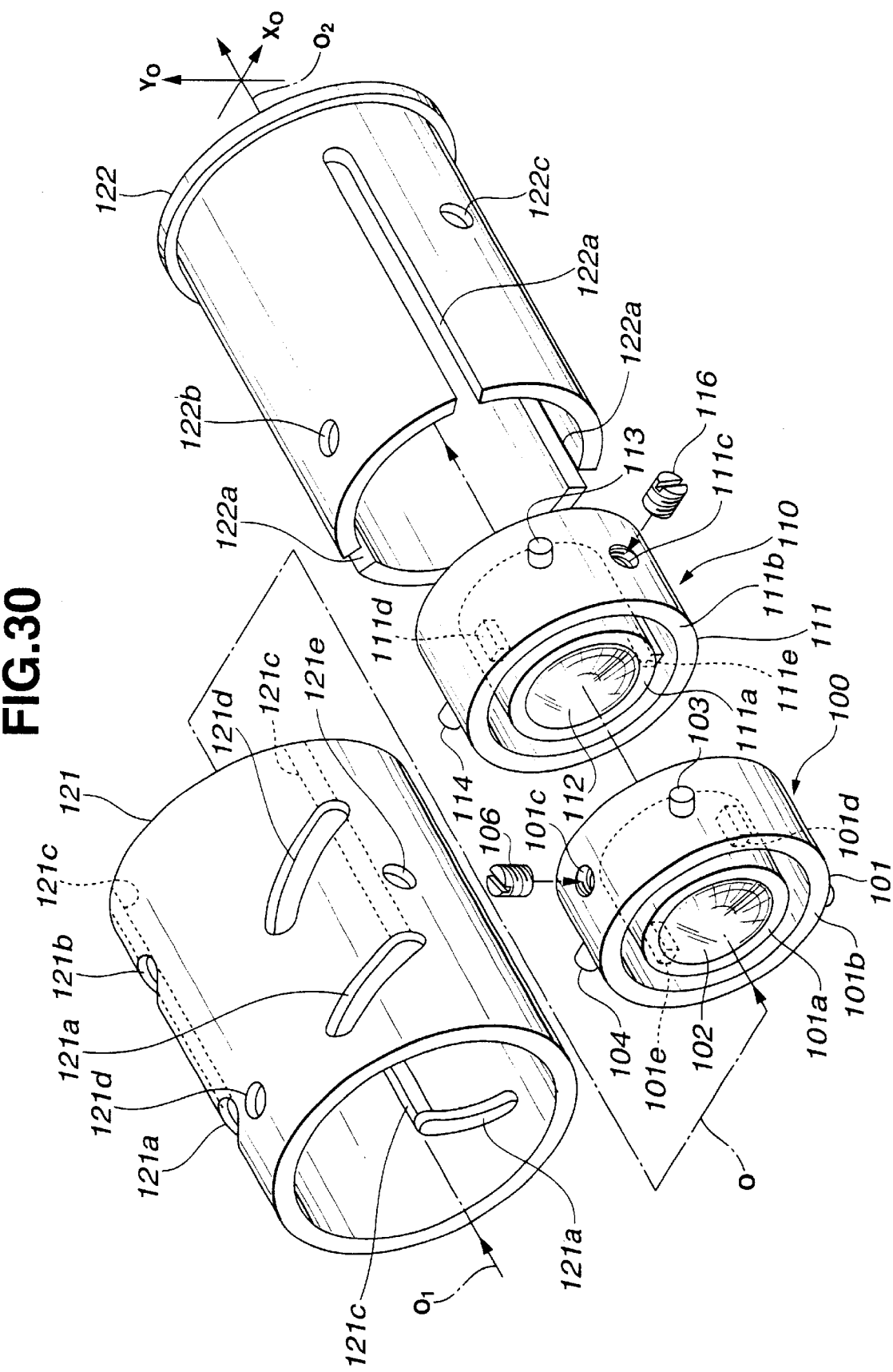
FIG. 30 is an exploded perspective view of a lens barrel that is a ninth embodiment of the present invention.

FIG. 30 is an exploded perspective view of the lens barrel that is the ninth embodiment of the present invention. As shown in this figure, this lens barrel is incorporated into optical equipment, such as a camera and a microscope and adapted in such a way as to be able to perform the adjustment of the position of the optical system optical axis. This lens barrel consists of a lens frame 100, another lens frame 110, a rectilinear cam ring 122 to which the lens frames 100 and 110 are incorporated in such a manner as to be able to proceed and retreat in the direction of the optical axis O, and a rotation cam ring 121 to be rotatably fitted into an outer peripheral portion of the rectilinear cam ring 122. Incidentally, in this lens barrel, it is assumed that a light incidence side optical axis is denoted by "$O_1$", and that a light output side optical axis is designated by "$O_1$".

Figure 31:
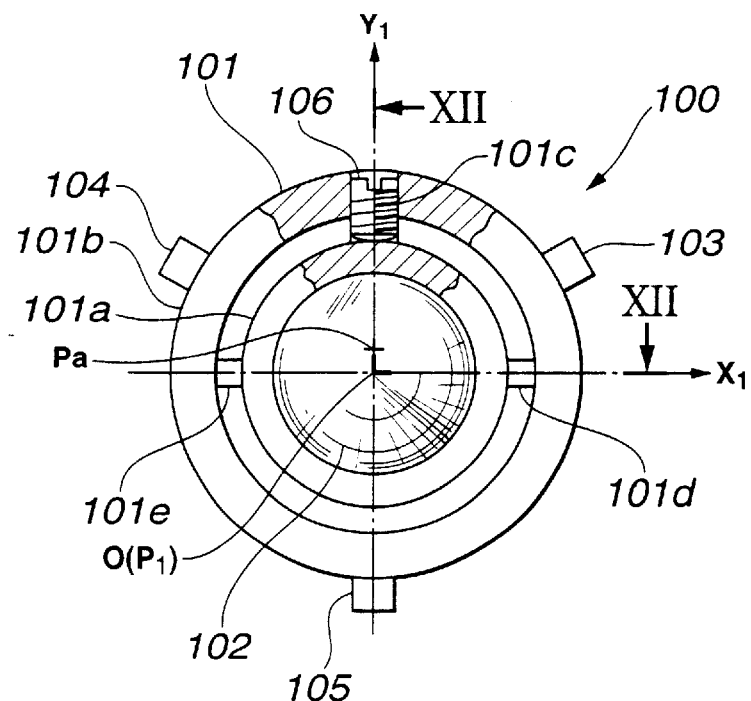
FIG. 31 is a plan view illustrating a lens frame applied to a lens barrel that is a ninth embodiment of the present invention.
Figure 32:
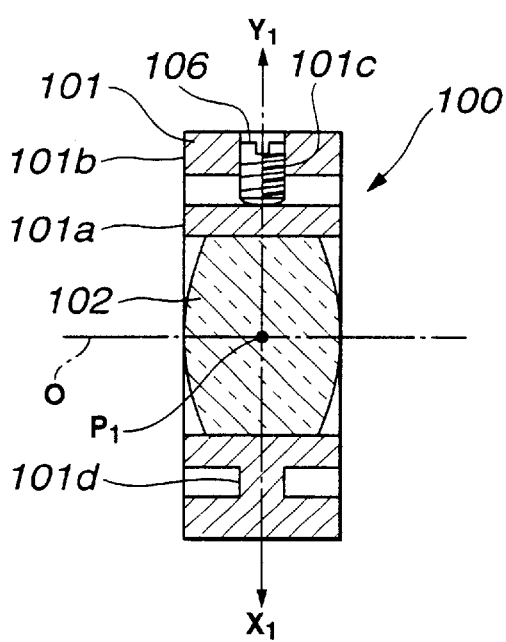
FIG. 32 is a sectional view taken on line XII-O-XII of FIG. 31.

As shown in FIG. 31, which is a front view of this lens frame 100, and FIG. 32, which is a sectional view thereof taken on line XII-O-XII of FIG. 31, the lens frame 100 consists mainly of a lens frame body 101 serving as a first frame enabled to perform the lens optical axis position by translation (parallel displacement) to a first direction (namely, the direction of $Y_1$-axis) in a plane perpendicular to the lens optical axis O corresponding to the center axis of the frame, a lens 102 serving as an optical device held by the lens frame body, and cam followers 103, 104, and 105 securely fixed onto the outer periphery of the lens frame body 101.

Incidentally, $X_1$-axis and $Y_1$-axis are orthogonal to each other and to the optical axis O of the lens 102 and correspond to horizontal and vertical directions, respectively. Further, the axis center line of each of plate spring portions 101d and 101e serving as connecting portions (to be described later) passes through above the point $P_1$ of intersection between $X_1$-axis and $Y_1$-axis.

Furthermore, it is assumed that an adjustment reference for the position of the lens optical axis in this lens barrel is an incorporated rectilinear cam ring 122.

The lens frame body 101 is an integral structure member in which a ring-like inner frame 101a for holding the lens 102 and a ring-like outer frame 101b, which is disposed on the outer periphery of the inner frame 101a so that there is a gap between the frames 101a and 101b, are connected by a connecting member (namely, a plate spring member). Incidentally, the cam followers 103, 104, and 105 are securely fixed at positions at which the outer circumference of the outer frame 101b is trisected.

The inner frame 101a and the outer frame 101b are connected by plate spring portions 101d and 101e, which are formed in such a way as to be integral with these frames 101b and 101c, and which are two deformable plate-like first connecting portions extending laterally along $X_1$-axis, as viewed from the direction of the optical axis.

Incidentally, it is assumed that the plate spring portions 101d and 101e can cause elastic deformation, which mainly includes shearing distortion, in the direction of $Y_1$-axis,. Further, these plate springs respectively have shapes, which are nearly symmetrical with respect to planes containing $X_1$-axis and $Y_1$-axis, so that when these plate springs are pushed by adjustment screws 106 (to be described later) through screw abutting portions of the inner frame 101a in the direction of $Y_1$-axis, the plate portions deform in such a way as to perform translation without being inclined to the optical axis O. That is, as described above, the axis center line of each of the plate spring portions 101d and 101e passes through above the point of intersection $P_1$. Further, the abutting surface of the adjustment screw 106 is placed on a plane containing the point of intersection $P_1$.

In the outer frame 101b, a female screw portion 101i serving as a first adjusting means is provided on $Y_1$-axis. Further, in the female screw portion 101c, an adjustment screw 106 serving as first regulating means has an end portion, which can abut against the outer periphery of the inner frame 101a, and is a flat-point-like slotted machine screw.

Incidentally, the initial lens optical axis position Pa in a state, in which the optical system position is unadjusted immediately upon completion of assembling the lens frame of this embodiment, is set in such a way as to be slightly upwardly eccentric from the center position (namely, the position of an optical axis O, which is an adjustment target position, of the lens frame 100), as viewed n FIG. 31.

An eccentricity amount of the position Pa in the direction of $Y_1$-axis is set in such a manner as to be more than at least an adjustment amount of the lens optical axis position, with intention of performing adjustment by maintaining a state in which the adjustment screw 106 are screwed thereinto and which the end face of the screw 106 is abutted against the screw abutting surface of the outer periphery of the inner frame 101a. Incidentally, the eccentricity in the direction of $X_1$-axis of the initial lens optical axis position Pa is comprehensively regulated by the lens frame 100 (to be described later). Thus, the position Pa has only to be placed nearly on $Y_1$-axis within a range of variation in products.

Figure 33:
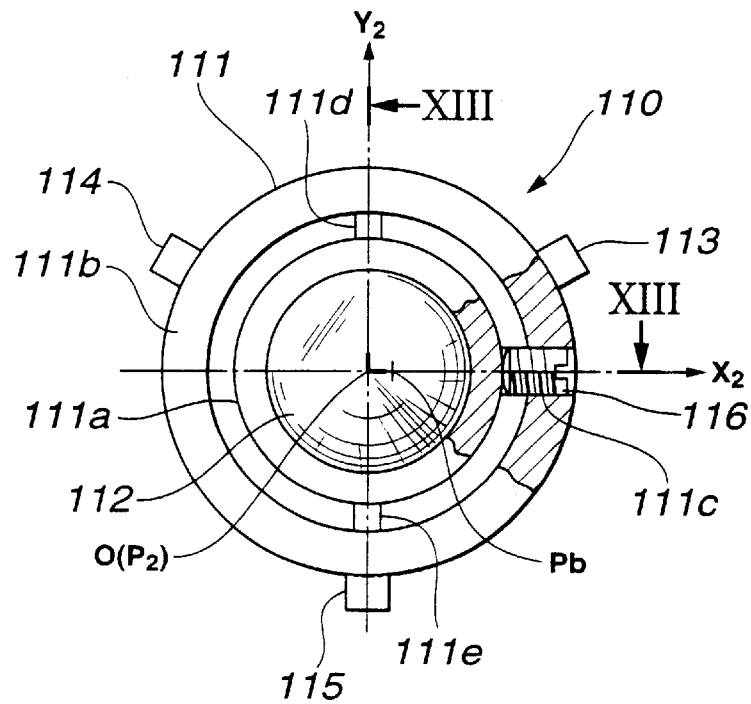
FIG. 33 is a plan view illustrating a lens frame that is a second frame applied to the lens barrel that is the ninth embodiment of the present invention.
Figure 34:
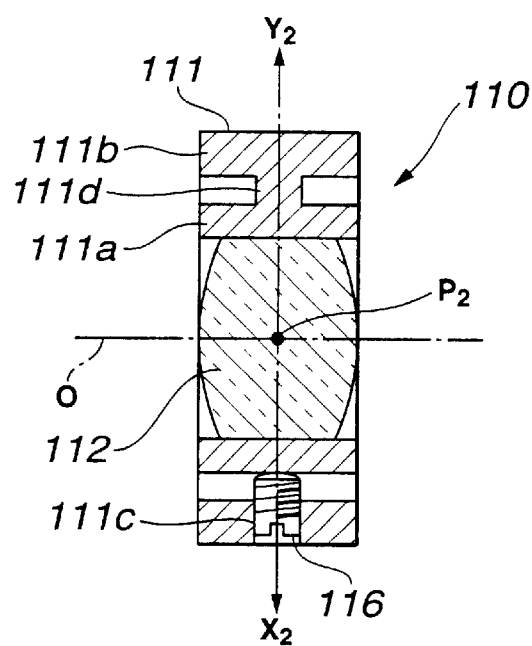
FIG. 34 is a sectional view taken on line XIII-O-XIII of FIG. 33.

On the other hand, as shown in FIG. 33, which is a front view of this lens frame 100, and FIG. 34, which is a sectional view thereof taken on line XII-O-XII of FIG. 33, the lens frame 110 consists mainly of a lens frame body 111 serving as a second frame enabled to perform the lens optical axis position by translation to a second direction (namely, the direction of horizontal $X_1$-axis (to be described later)) orthogonal to the fist direction in a plane perpendicular to the lens optical axis O corresponding to the center axis of the frame, a lens 112 serving as an optical device held by the lens frame body, and cam followers 113, 114, and 115 securely fixed onto the outer periphery of the lens frame body 111.

Incidentally, $X_2$-axis and $Y_2$-axis are orthogonal to each other and to the optical axis O of the lens 112 and correspond to horizontal and vertical directions, respectively. Further, the axis center line of each of plate spring portions 111d and 111e serving as connecting portions (to be described later) and passes through above the point $P_2$ of intersection between $X_2$-axis and $Y_2$-axis, which are parallel to $X_1$-axis and $Y_1$-axis of the lens frame 100, respectively. Thus, $X_2$-axis and $Y_2$-axis are orthogonal to $Y_1$-axis (corresponding to the first direction) and $X_2$-axis (corresponding to the second direction).

The lens frame body 111 is an integral structure member in which a ring-like inner frame 111a for holding the lens 112 and a ring-like outer frame 111b, which is disposed on the outer periphery of the inner frame 111a so that there is a gap between the frames 111a and 111b, are connected by a connecting member (namely, a plate spring member). Incidentally, the cam followers 113, 114, and 115 are securely fixed at positions at which the outer circumference of the outer frame 111b is trisected.

The inner frame 111a and the outer frame 111b are connected by plate spring portions 111d and 111e, which are formed in such a way as to be integral with these frames 111b and 111c, and which are two deformable plate-like first connecting portions extending upwardly and downwardly along $Y_2$-axis, as viewed from the direction of the optical axis.

Incidentally, it is assumed that the plate spring portions 111d and 111e can cause elastic deformation, which mainly includes shearing distortion, in the direction of $Y_2$-axis. Further, these plate springs respectively have shapes, which are nearly symmetrical with respect to planes containing $X_2$-axis and $Y_2$-axis, so that when these plate springs are pushed by adjustment screws 116 (to be described later) through screw abutting portions of the inner frame 111a in the direction of $Y_2$-axis, the plate portions deform in such a way as to perform translation (parallel displacement) without being inclined to the optical axis O. That is, as described above, the axis center line of each of the plate spring portions 111d and 111e passes through above the point of intersection $P_2$. Further, the abutting surface of the adjustment screw 116 is placed on a plane containing the point of intersection $P_2$.

In the outer frame 111b, a female screw portion 111i serving as a first adjusting means is provided on $X_2$-axis. Further, in the female screw portion 111c, an adjustment screw 116 serving as first regulating means has an end portion, which can abut against the outer periphery of the inner frame 111a, and is a flat-point-like slotted machine screw.

Incidentally, the initial lens optical axis position Pb in a state, in which the optical system position is unadjusted immediately upon completion of assembling the lens frame of this embodiment, is set in such a way as to be slightly upwardly eccentric from the center position (namely, the position of an optical axis O, which is an adjustment target position of the lens frame 110), as viewed n FIG. 33.

An eccentricity amount of the position Pb in the direction of $X_2$-axis is set in such a manner as to be more than at least an adjustment amount of the lens optical axis position, with intention of performing adjustment by maintaining a state in which the adjustment screw 116 are screwed thereinto and which the end face of the screw 116 is abutted against the screw abutting surface of the outer periphery of the inner frame 111a. Incidentally, the eccentricity in the direction of $Y_2$-axis of the initial lens optical axis position Pb is comprehensively regulated by the lens frame 110. Thus, the position Pb has only to be placed nearly on $X_2$-axis within a range of variation in products.

The rectilinear cam ring 122 is a stationary member mounted on the optical equipment and has three rectilinear guide grooves 122a, into which the cam followers 103, 104, 105 and 113, 114, 115 of the lens frames 100 and 110 are slidably fitted, in the outer peripheral portion thereof, and has openings 122b and 122c, through which the adjustment screws 106 and 116 of the frames 100 and 110 are inserted, for regulating these screws 106 and 116.

The rotational cam ring 121 is a member rotatably fitted into the outer periphery of the rectilinear cam ring 122 and has three cam grooves 121a, into which the cam followers 103, 104, 105 of the lens frame 100 are respectively slidably fitted, and three cam grooves 121b, into which the cam followers 113, 114, 115 of the lens frame 110 are respectively slidably fitted, and three guide grooves 121c for fitting the cam followers into the corresponding cam grooves 121a and 121b in the outer peripheral portion thereof, and has openings 121d and 121e, through which the adjustment screws 106 and 116 of the frames 100 and 110 are inserted, for regulating these screws 106 and 116.

In the lens barrel of this embodiment, the lens frames 100 and 110 are incorporated thereinto in a side-by-side manner by fitting the cam followers into the guide grooves 122a in the inner peripheral portion of the rectilinear cam ring 122. Moreover, the rotational cam ring 121 is fitted into the outer peripheral portion of the rectilinear cam ring 122. Furthermore, the cam followers of the lens frame are fitted into the cam grooves 121a and 121b.

Next, an optical axis position adjusting operation of the lens barrel of the ninth embodiment constructed in the aforementioned manner will be described hereinbelow.

The optical axis position adjustment of the lens barrel, to which the lens frames 100 and 110 are incorporated, is performed on the rectilinear cam ring 122 and the rotational cam ring 121 by using an adjustment jig consisting of a point light source portion and an optical-axis detecting CCD portion. When such adjustment is performed, the point light source portion of the adjustment jig is set at the light incidence side thereof, while the CCD portion is set at the light output side thereof. Further, the optical axis position is caused to perform translation (parallel displacement) in a plane orthogonal to the optical axis of the lens according to an optical axis detection signal outputted from the CCD portion. Thus, the optical axis position is adjusted to a target optical axis position.

Incidentally, an optical axis $O_2$ at the light output side is employed as an adjustment target optical axis position. Further, an axis passing through this optical axis $O_2$ and parallel to $Y_1$-axis and $Y_2$-axis is designated by "$Y_0$-axis". Moreover, an axis passing through this optical axis $O_2$ and parallel to $X_1$-axis and $X_2$-axis is designated by "$X_0$-axis".

First, the screwing depth of the adjustment screw 106 of the lens frame 100 is regulated through the openings 121d and 122b so as to perform the adjustment of the optical axis position in the direction of $Y_0$-axis. That is, when the adjustment screw 106 is screwed, the plate springs 101d and 101e deform, so that the inner frame 101a translates downwardly in the direction of $Y_1$-axis by maintaining the parallel condition thereof with respect to the optical axis O. Thus, the optical axis position in the direction of $Y_0$-axis is determined.

Subsequently, the screwing depth of the adjustment screw 116 of the lens frame 110 is regulated through the openings 121e and 122c so as to perform the adjustment of the optical axis position in the direction of $X_0$-axis. That is, when the adjustment screw 116 is screwed, the plate springs 111d and 111e deform, so that the inner frame 111a translates leftwardly from the direction of $X_2$-axis by maintaining the parallel condition thereof with respect to the optical axis O. Thus, the optical axis position in the direction of $X_0$-axis is determined.

As a result of the positioning adjustment in $X_0$-axis and $Y_0$-axis, the comprehensive optical axis position at the light output side of each of the lens frames 100 and 110 is adjusted to the target optical axis position $O_2$. Upon completion of setting the adjusted position, the adjustment is finished by fixing the adjustment screws 106 and 116 to the female screw portions 101c and 111c by adhesives, respectively.

Incidentally, the movement of the frame portions at the time of adjustment of the lens optical axis position is realized by the deformation in the direction of $Y_1$-axis of the plate spring portions (or deformation portions) 101d and 101e and by the deformation in the direction of $X_2$-axis of the plate spring portions (or deformation portions) 111d and 111e. Such deformation is microdeformation and synthesized from one or both of the bending strain, which is caused due to the bending moment of the parallel spring portion, and the shearing strain, which is caused owing to the hearing force thereof.

Additionally, if readjustment of the lens frame is not performed, the plate spring portions 101d, 101e, 111d, and 111e may utilize not only elastic deformation but also plastic deformation.

As described above, in the case of the lens barrel of this ninth embodiment, the adjustments of the optical axis position utilizing translation in the two lens frames 100 and 110 correspondingly to the directions of $X_0$-axis and $Y_0$-axis can be performed independently thereof. Thus, the adjustment operations are extremely simplified. Moreover, the adjustment accuracy is enhanced. Simultaneously, the cost thereof is reduced because of the simple structure of the lens frames 100 and 110.

Incidentally, in the lens barrels of the aforementioned embodiments, the first and second directions for the optical axis adjustment are set to be orthogonal to each other. It is unnecessary that the first and second directions are orthogonal to each other in the strict sense. Even when the first and second directions are nearly orthogonal to each other, the optical axis adjustment can be performed. Further, in the foregoing description, both the optical axes of the lenses 102 and 112 are adjusted to the optical axis $O_2$. However, the position of the optical axes are not limited thereto. As long as the optical axes of the lenses 102 and 112 coincide with each other, other positions of these optical axes may be employed. Thus, the optical axes of the lenses 102 and 112 are not necessarily adjusted to the optical axis $O_2$.

As described above, according to the lens barrel of the ninth embodiment of the present invention, the adjustment of the positions of the optical axes of the lenses can be performed by using the first frame and the second frame and utilizing the translation of the optical axes in two directions. Thus, the adjustment operation is easily achieved. Moreover, the structure of the lens frame is simplified.

Next, a lens barrel, which is a tenth embodiment of the present invention, will be described hereinbelow.

Figure 35:
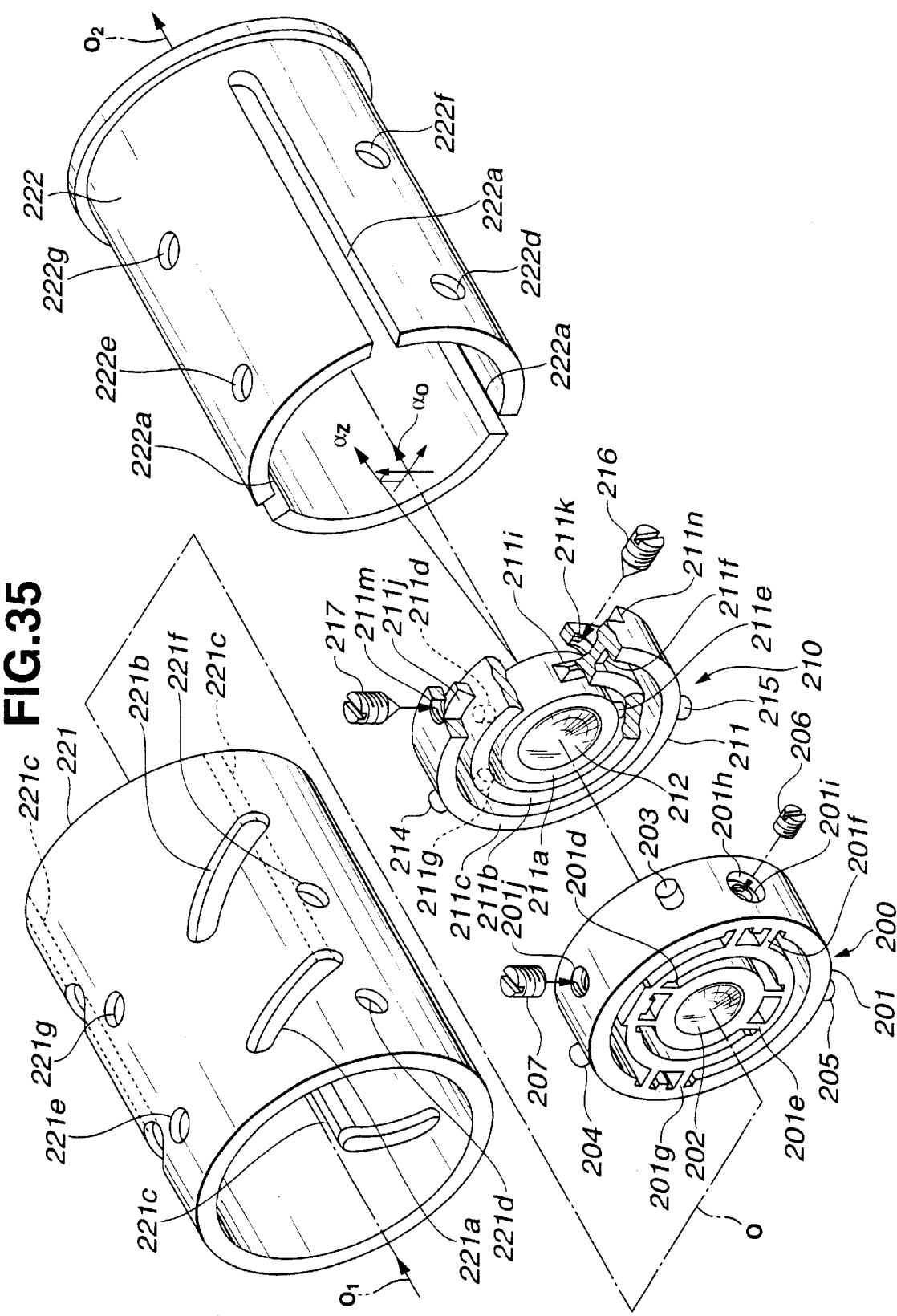
FIG. 35 is an exploded perspective view of a lens barrel that is a tenth embodiment of the present invention.

FIG. 35 is an exploded perspective view of the lens barrel that is the tenth embodiment of the present invention. As shown in this figure, this lens barrel is incorporated into optical equipment, such as a camera and a microscope and adapted in such a way as to be able to perform the adjustment of the position of the optical system optical axis. This lens barrel consists of a lens frame 200, another lens frame 210, a rectilinear cam ring 222 to which the lens frames 200 and 210 are incorporated in such a manner as to be able to proceed and retreat in the direction of the optical axis O, and a rotation cam ring 221 to be rotatably fitted into an outer peripheral portion of the rectilinear cam ring 122. Incidentally, in this lens barrel, it is assumed that a light incidence side optical axis is denoted by "$O_1$", and that a light output side optical axis is designated by "$O_2$".

Figure 36:
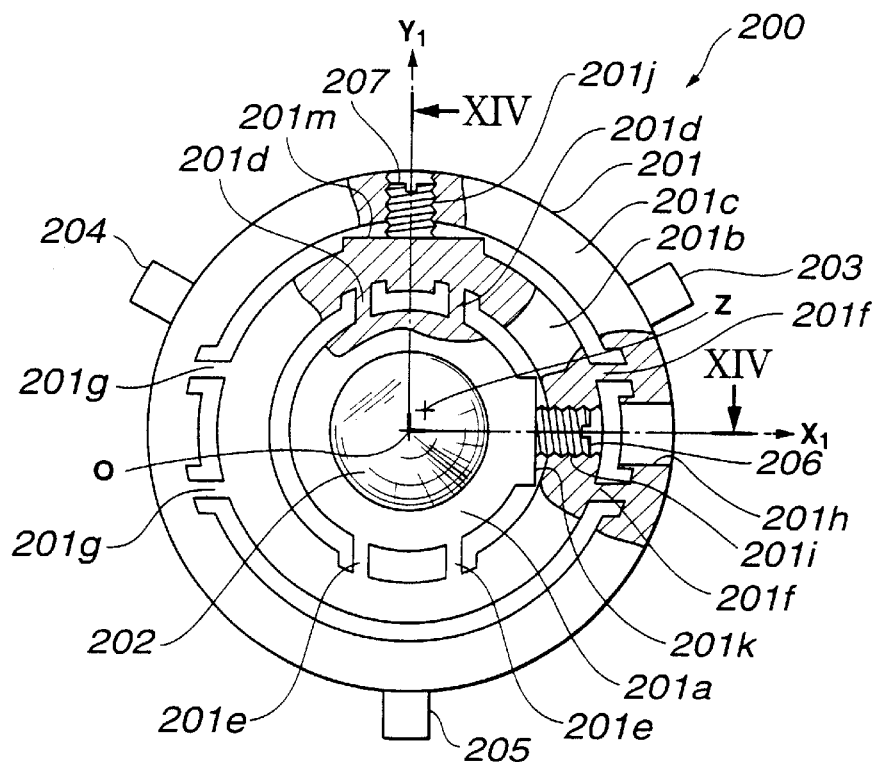
FIG. 36 is a plan view illustrating a lens frame having a first frame applied to the lens barrel that is the tenth embodiment of the present invention.
Figure 37:
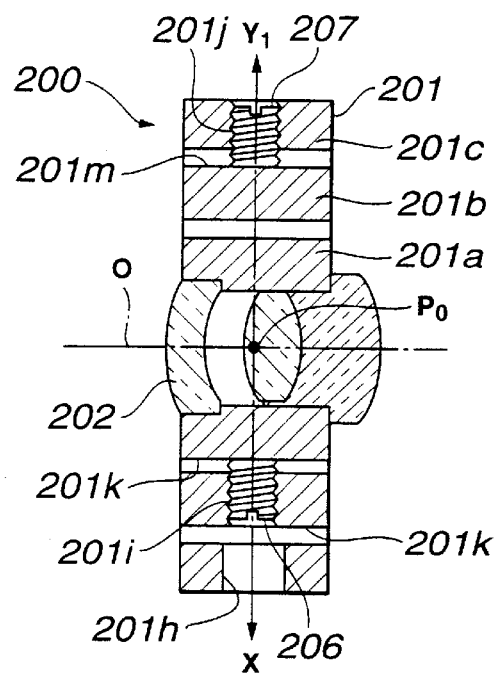
FIG. 37 is a sectional view taken on line XIV-O-XIV of FIG. 36.

As shown in FIG. 36, which is a front view of this lens frame 200, and FIG. 37, which is a sectional view thereof taken on line XII-O-XII of FIG. 36, the lens frame 200 consists mainly of a lens frame body 201 serving as a first frame, a lens 202 serving as an optical device held by the lens frame body, and cam followers 203, 204, and 205 securely fixed onto the outer periphery of the lens frame body 201. In the case of this lens frame 200, the translation adjustment (namely, the centration) of the optical axis position of the lens 202, namely, the optical axis position in a plane orthogonal to the lens optical axis O can be performed. This lens 202 incorporated into the frame 200 has a lens configuration that significantly contributes the optical axis position adjustment (or the centering).

Incidentally, $X_1$-axis and $Y_1$-axis are orthogonal to each other and to the optical axis O of the lens 202 and correspond to horizontal and vertical directions, respectively. Further, the axis center lines of plate spring portions 201d and 201e and 201f and 201g serving as connecting portions (to be described later) intersect with one another above the point $P_0$ of intersection between $X_1$-axis and $Y_1$-axis.

The lens frame body 201 is an integral structure member in which a ring-like inner frame 201a for holding the lens 202 and a ring-like intermediate frame 201b, which is disposed on the outer periphery of the inner frame 201a so that there is a gap between the frames 201a and 201b, and a ring-like outer frame 201c, which is disposed on the outer periphery of the intermediate frame 201b so that there is a gap between the frames 201b and 201c, are connected by a connecting member (namely, a plate spring member). Incidentally, the cam followers 203, 204, and 205 are securely fixed at positions at which the outer circumference of the outer frame 201c is trisected.

The inner frame 201a and the intermediate frame 201b are connected by parallel spring portions 201d and 201e, which are formed in such a way as to be integral with these frames 201a and 201b, and which are two deformable plate-like first connecting portions extending upwardly and downwardly and striding over $Y_1$-axis, as viewed from the direction of the optical axis.

Further, the intermediate frame 201b and the outer frame 201c are connected by parallel spring portions 201f and 201g, which are formed in such a way as to be integral with these frames 201b and 201c, and which are two deformable plate-like first connecting portions extending laterally and striding over $X_1$-axis, as viewed from the direction of the optical axis.

Incidentally, the plate spring portions 201d, 201e and 201f, 201g deform in the direction of $X_1$-axis or $Y_1$-axis when the screw abutting portion is pressed by adjustment screws (to be described later), in such a manner as to maintain the parallel relation therebetween, so that the inner frame 201a or the intermediate frame 201b translates without being inclined to the optical axis O. This is because of the facts that the center lines of the parallel spring portions 201d, 201e, and 201f, 201g pass through the point of intersection $P_0$ and have shapes each of which is symmetric with respect to a plane containing $X_1$-axis and $Y_1$-axis, and that the screw abutting portions of the adjustment screws (to be described later) are placed on $X_1$-axis and $Y_1$-axis.

Furthermore, regarding two sets of two parallel springs 201d, 201e and 201f, 201g, each of these parallel springs can perform the functions thereof.

In the intermediate frame 201b, a female screw portion 201i serving as a first adjusting means is provided on $X_1$ axis. In the inner frame 201a, a screw abutting surface 201k is provided at a place inwardly opposed to the female screw portion 201i. Further, in the outer frame 201c, an opening 201h, through which the adjustment screw passes, is provided at a place outwardly opposed to the female screw portion 201i. Similarly, in the outer frame 201c, a female screw portion 201j as adjusting means of the body 201 is provided. In the intermediate frame 201b, a screw abutting surface 201m is provided at a place inwardly opposed to the female screw portion 201j.

In the intermediate frame 201b, an adjustment screw 206 serving as first adjusting means is screwed through the opening 201h. Furthermore, in the female screw portion 201 of the outer frame 201c, an adjustment screw 207 serving as the first adjusting means is screwed. Incidentally, the screws 206 and 207 are flat-point-like slotted machine screws. Preferably, the end portion of such a screw has a curved or spherical surface.

Incidentally, the initial lens optical axis position Z in a state, in which the optical system position is unadjusted immediately upon completion of assembling the lens frame of this embodiment, is set in such a way as to be slightly upwardly eccentric from the center position (namely, the position of an optical axis O, which is an adjustment target position, of the lens frame 200), as viewed n FIG. 36. An eccentricity amount of the position Z is set in such a manner as to be more than at least an adjustment amount of the lens optical axis position, with intention of performing adjustment by maintaining a state in which the adjustment screw 206 are screwed thereinto and which the end face of the screw 206 is abutted against the screw abutting surface of the screw abutting surface 201k and 201a.

Figure 38:
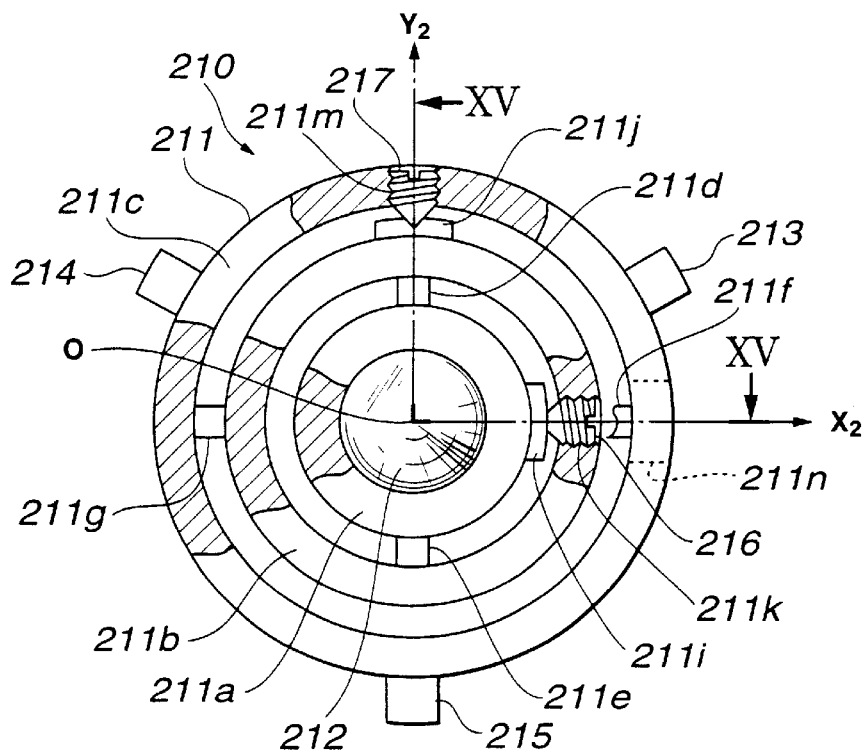
FIG. 38 is a plan view illustrating a lens frame having a second frame applied to the lens barrel that is the tenth embodiment of the present invention.
Figure 39:
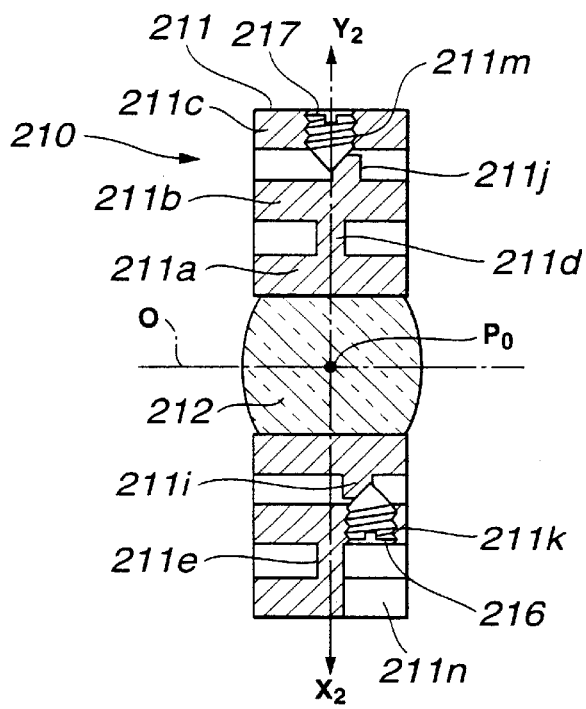
FIG. 39 is a sectional view taken on line XV-O-XV of FIG. 38.
Figure 40:
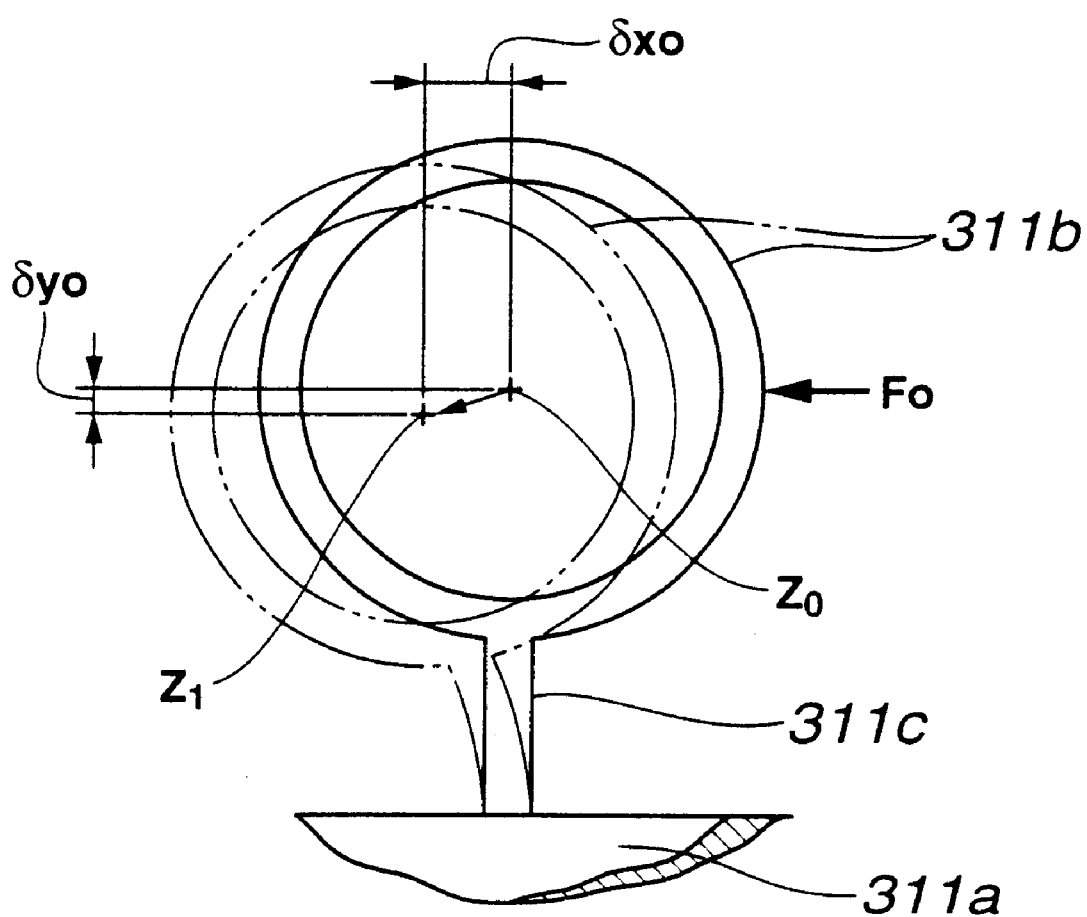
FIG. 40 is an enlarged view of an optical axis position adjusting structure of a conventional frame portion.

On the other hand, as shown in FIG. 38, which is a front view of this lens frame 210, and FIG. 39, which is a sectional view thereof taken on line XV-O-XV of FIG. 38, the lens frame 210 consists mainly of a lens frame body 211 serving as a second, a lens 212 serving as an optical device held by the lens frame body, and cam followers 213, 214, and 215 securely fixed onto the outer periphery of the lens frame body 211. This lens frame 210 is adapted so that the adjustment of the optical system position of the lens 212, namely, the adjustment of the incline of the optical axis O can be performed. The lens 212 incorporated into this lens frame 210 has a lens configuration that greatly contributes to the inclination of the lens optical axis.

Incidentally, $X_2$-axis and $Y_2$-axis are orthogonal to each other and to the optical axis O of the lens 212 and correspond to horizontal and vertical directions, respectively. Further, the axis center line of each of cylindrical portions 211d, 211e and 211f, 211g serving as connecting portions (to be described later) and passes through above the point $P_0$ of intersection between $X_2$-axis and $Y_2$-axis, which are parallel to $X_1$-axis and $Y_1$-axis, respectively.

Moreover, it is supposed that the surface side of the lens frame 210 on FIG. 38 (which corresponds to the left-hand side thereof, as viewed in FIG. 39) is the "front side" thereof, and that the back side thereof on FIG. 38 (which corresponds to the right-hand side thereof, as viewed in FIG. 39) is the "rear side" thereof.

The lens frame body 211b is an integral structure member in which a ring-like inner frame 211a for holding the lens 212, a ring-like intermediate frame 211b, which is disposed on the outer periphery of the inner frame 211a so that there is a gap between the frames 211a and 211b, and a ring-like outer frame 211c, which is disposed on the outer periphery of the intermediate frame 211b so that there is a gap between the frames 211b and 211c are connected by a connecting member. Incidentally, the cam followers 213, 214, and 215 are securely fixed at positions at which the outer circumference of the outer frame 211b is trisected.

The inner frame 211a and the intermediate frame 211b are connected by cylindrical portions 211d and 211e, which are formed in such a way as to be integral with these frames 211a and 211b, and which are two distortionally deformable cylindrical portions serving as connecting portions and extending upwardly and downwardly along $Y_2$-axis, as viewed from the direction of the optical axis.

Furthermore, the intermediate frame 211b and the outer frame 211c are connected by cylindrical portions 211f and 211g, which are formed in such a way as to be integral with these frames 211a and 211b, and which are two distortionally deformable cylindrical portions serving as connecting portions and extending laterally on $X_2$-axis.

In the intermediate frame 211b, a female screw portion 211k serving as a second adjusting means is provided in the vicinity of $X_2$-axis, in a right side part of the outer periphery of the intermediate frame of FIG. 38. Further, in the female screw portion 211c, a female screw portion 211m serving as a second adjusting means is provided in the vicinity of $Y_2$-axis, in a upper part of the outer periphery of the outer frame of FIG. 38. Incidentally, a notch 211n, through which the adjustment screw passes, is provided at a place opposed to the female screw portion 211k. of the outer frame 211c.

An adjustment screw 216 serving as second adjusting means is screwed in the female screw portion 211k of the intermediate frame 211b. An adjustment screw 217 serving as second adjusting means is screwed in the female screw portion 211m of the outer frame 211c. The adjustment screws 216 and 217 are slotted machine screws each having a conical end portion.

Furthermore, the inner frame 211a is provided with an inclined projection portion 211i, which serves as an inclination adjusting mechanism projecting to a place opposed to the female screw portion 211k of an upper part of the outer peripheral portion of the inner frame 211a and inclining outwardly, radially and backwardly on $X_2$-axis, in a right-hand side part of the outer peripheral portion thereof. Further, similarly, the intermediate frame 211b is provided with an inclined projection portion 211j, which serves as an inclined portion outwardly that projects to a place opposed to the female screw portion 211m of the outer frame 211c and upwardly from the outer peripheral portion thereof, and that extends on the $Y_2$-axis and inclines backwardly and outwardly.

The inclined surfaces of the projection portions 211i and 211j can be pressed by the adjustment screws 216 and 217 from the directions of $X_2$-axis and $Y_2$-axis. When pressed by the screws 216 and 217, the intermediate frame 211b and the outer frame 211c are inclined to $X_2$-axis and $Y_2$-axis, so that the inclination of the optical axis of the lens 212 can be changed.

Incidentally, the initial lens optical axis direction (namely, the inclination of the optical axis at the light output side) $\alpha_z$ put in a state, in which the optical system position is unadjusted immediately upon completion of assembling the frame 210, is turned upwardly and leftwardly from the adjustment target direction $\alpha_0$ (namely, the degree of the optical axis angle is 0°) within an adjustable range, a shown in FIG. 35. The reason for preliminarily turning the initial lens optical axis direction $\alpha_z$ by a predetermined number of degrees is that the adjustment should be performed by maintaining a state in which the conical end portions of the adjustment screws are abutted against the abutting portion 211i and 211j.

The rectilinear cam ring 222 is a stationary member mounted on the optical equipment and has three rectilinear guide grooves 222a, into which the cam followers 203, 204, 205 and 213, 214, 215 of the lens frames 200 and 210 are slidably fitted, in the outer peripheral portion thereof, and has openings 222d and 222e, through which the adjustment screws 206 and 207 of the frames 200 are inserted, for regulating these screws 206 and 207, and has openings 222f and 222g, through which the adjustment screws 216 and 217 of the frames 210 are inserted, for regulating these screws 216 and 217

The rotational cam ring 221 is a member rotatably fitted into the outer periphery of the rectilinear cam ring 222 and has three cam grooves 221a, into which the cam followers 203, 204, 205 and 213, 214, 215 of the lens frame 200 and 210 are respectively slidably fitted, and three cam grooves 221b, into which the cam followers 213, 214, 215 of the lens frame 210 are respectively slidably fitted, and three guide grooves 221c for fitting the cam followers into the corresponding cam grooves 221a and 221b in the outer peripheral portion thereof, and has openings 221d and 221e, through which the adjustment screws 206 and 216 of the frames 200 and 210 are inserted, for regulating these screws 206 and 216.

In the lens barrel of this embodiment, the lens frames 200 and 210 are incorporated thereinto in a side-by-side manner by fitting the cam followers into the guide grooves 222a in the inner peripheral portion of the rectilinear cam ring 222 so that the frame 210 is incorporated at the light output side and that the frame 220 is incorporated at the light incidence side. Moreover, the rotational cam ring 221 is fitted into the outer peripheral portion of the rectilinear cam ring 222. Furthermore, the cam followers of the lens frame are rotatably fitted into the cam grooves 221a and 221b. Thus, the assembling of this lens barrel is completed.

Next, an optical axis position adjusting operation of the lens barrel of the tenth embodiment constructed in the aforementioned manner will be described hereinbelow.

The optical axis position adjustment of the lens barrel in a state, in which the lens frames 200 and 210 are respectively incorporated into the rectilinear cam ring 222 and the rotational cam ring 221, is performed by using an adjustment jig consisting of a point light source portion and an optical-axis detecting CCD portion. When such adjustment is performed, the point light source portion of the adjustment jig is set at the light incidence side thereof, while the CCD portion is set at the light output side thereof. Further, the adjustment of the incline of the lens optical axis, and the adjustment of the optical axis position utilizing the translation of the lens in a plane orthogonal to the optical axis of the lens according to an optical axis detection signal outputted from the CCD portion.

First, the screwing depth of the adjustment screws 216 and 217 of the lens frame 210 is regulated through the openings 221f, 222f and 221g, 222g so as to perform the adjustment of the inclination of the lens optical axis. That is, the inclined projection portions 211I is pressed by the end portion of the adjustment screw, the cylindrical portions 211d and 211e distortionally deform, so that the inner frame 211a holding the lens 212 is inclined clockwise (as viewed from above in FIG. 35).

Further, the inclined projection portion 211j is pushed by the end portion of the adjustment screw 217, so that the cylindrical portions 211f and 211g distortionally deform and that the inner frame 211a and the intermediate frame 211b are turned clockwise (as viewed from the right-hand side in FIG. 35). Thus, the incline a the initial lens optical axis inclination $\alpha_z$ of the optical axis $O_2$ is adjusted to the adjustment target direction $\alpha_0$. As a result of this adjustment, the adjustment of the comprehensive inclination of the optical axis of the frames 200 and 210 is obtained. Thus, the adjustment of at least one direction can be achieved.

Next, the screwing depth of the adjustment screws 206 and 207 of the lens frame 200 is regulated through the openings 221d, 222d and 221e, 222e so as to perform the adjustment of the position of the optical axis. That is, when the screw 206 is screwed, the parallel spring portions 201d, 201e perform bending deformation (strictly speaking, bending or shearing or the combination thereof), so that the inner frame 201a translates in the direction of $X_1$ by maintaining the parallel condition thereof with respect to the optical axis O.

Further, when the screw 207 is screwed, the parallel spring portions 201f and 201g deform, so that the intermediate frame 201b translates in the direction of $Y_1$ by maintaining the parallel condition thereof with respect to the optical axis O. As a result of this translation, the lens optical axis position of the output side optical axis $O_2$ is adjusted to the target optical axis position 0. The comprehensive optical axis position of the frames 200 and 210 is obtained by this adjustment. Thus, the adjustment of at least one direction can be achieved.

Thereafter, the screws 206, 207 and 216, 217 are fixed to the female screw portions 201l, 201j and 211k, 211m. Then, the adjustment is finished.

As described above, according to the lens barrel of the tenth embodiment of the present invention, the adjustment of the position of the optical axes of the lenses and the adjustment of the inclination of the optical axis thereof by utilizing the translation of the optical axes are independently performed in two lens frames 200 and 210. Thus, the adjustment operation is significantly simplified. The adjustment accuracy is enhanced. Simultaneously, the cost is reduced because of the simple structures of the lens frames 200 and 210.

Incidentally, although the adjustment of the position of the optical axis is performed on the frame 210 and the frame 200 in this order, the order of performing the adjustment of the position and inclination of the optical axis is not limited thereto.

Additionally, in the lens barrel of the embodiments, the adjustment of the optical axis position and the adjustment of the optical axis inclination are performed by maintaining the state in which the frames 200 and 210 are incorporated in the rectilinear cam ring 222. However, the frames 200 and 210 greatly affects the optical axis position and the optical axis inclination, respectively. Thus, the adjustment operation may be performed as follows. That is, the adjustment of the optical axis position is performed on the frame 200 singly, while the adjustment of the optical axis inclination is performed on the frame 210 single. Thereafter, the frames 200 and 210 are incorporated into the rectilinear cam ring 222 and the rotational cam ring 221.

Further, if readjustment of the lens frame is not performed, deformation of the parallel spring portions 201d and 201f of the frame 200 and that of the cylindrical portions 211d and 211f of the frame 210 may be obtained by utilizing not only elastic deformation but also plastic deformation.

As described above, according to the lens barrel of the tenth embodiment of the present invention, the adjustment of the positions of the optical axes of the lenses can be performed by using the first frame and the second frame, respectively. Thus, the adjustment operation is easily achieved. Moreover, the adjustment accuracy is enhanced. Furthermore, the structure of the lens frame is simple. Consequently, significant reduction in cost is achieved.

Although the preferred embodiments of the present invention have been described above, it should be understood that the present invention is not limited thereto and that other modifications will be apparent to those skilled in the art without departing from the sprint of the invention.

The scope of the present invention, therefore, should be determined solely by the appended claims.

What is claimed is:

1. A lens barrel comprising:
   a frame member including a first frame portion having an optical axis of said lens barrel, a second frame portion, a third frame portion, a first connecting portion for connecting said first frame portion to said second frame portion, and a second connecting portion for connecting said second frame portion to said third frame portion; and
   adjusting members, provided in said second and third frame portions, respectively, said adjusting members deforming said first and second connecting portions, and performing translation adjustment of the first frame in a plane orthogonal to the optical axis without causing rotational displacement of said first frame portion.

2. The lens barrel according to claim 1, wherein said first and second connecting portions are constituted by parallel springs, respectively.

3. The lens barrel according to claim 1, wherein said first frame portion has an optical device.

4. The lens barrel according to claim 1, wherein said optical device is constituted by a lens having a noncircular outside shape.

5. The lens barrel according to claim 1, wherein said first, second, and third frame portions are formed in such a manner as to be integral with one another.

6. The lens barrel according to claim 1, wherein said adjusting members are screws.

7. The lens barrel according to claim 1, wherein said adjusting members are adjusted from a direction perpendicular to the optical axis.

8. The lens barrel according to claim 1, wherein said moving frame further comprises a third adjusting member for performing rocking adjustment of said first frame in a plane orthogonal to the optical axis.

9. The lens barrel according to claim 1, wherein said frame member is rectangular in form.

10. The lens barrel according to claim 1, wherein said first, second, and third frame portions of said frame member are formed in such a manner as to be integral with one another.

11. A lens barrel comprising:
 a frame member including a first frame portion having an optical axis of said lens barrel, a second frame portion, a third frame portion, and a connecting portion for connecting said first frame portion to said second frame portion; and
 an adjusting member, provided in said second frame portion, said adjusting member deforming said connecting portion, and performing translation adjustment of the first frame in a plane orthogonal to the optical axis without causing rotational displacement of said first frame portion.

12. The lens barrel according to claim 11, wherein said connecting portion is constituted by a parallel spring.

13. The lens barrel according to claim 12, wherein said parallel spring extends in a radial direction thereof between said first and second frame portions.

14. The lens barrel according to claim 12, wherein said parallel spring extends in a direction of the optical axis between said first and second frame portions.

15. The lens barrel according to claim 12, wherein said parallel spring is constituted by a pair of elastic plates.

16. The lens barrel according to claim 11, wherein said first frame portion has an optical device.

17. The lens barrel according to claim 16, wherein said optical device is constituted by a lens having a noncircular outside shape.

18. The lens barrel according to claim 11, wherein said first and second frame portions are formed in such a manner as to be integral with one another.

19. The lens barrel according to claim 11, wherein said adjusting member is a screw.

20. The lens barrel according to claim 11, wherein said adjusting member is adjusted from a direction perpendicular to the optical axis.

21. The lens barrel according to claim 11, wherein said frame member further comprises a rocking adjustment member for performing rocking adjustment of said first frame in a plane orthogonal to the optical axis.

22. The lens barrel according to claim 11, wherein said frame member is rectangular in form.

* * * * *

UNITED STATES PATENT AND TRADEMARK OFFICE
CERTIFICATE OF CORRECTION

PATENT NO. : 6,262,853 B1
DATED : July 17, 2001
INVENTOR(S) : Tatsuo Takanashi et al.

It is certified that error appears in the above-identified patent and that said Letters Patent is hereby corrected as shown below:

Column 38
Line 55, change "claim 1" to -- claim 3 --;

Column 38
Line 62, change "members are screws" to -- member is a screw --;

Column 40
Line 21, change "frame in" to -- frame portion in --;

Signed and Sealed this

Twenty-fifth Day of March, 2003

JAMES E. ROGAN
*Director of the United States Patent and Trademark Office*